United States Patent
Aoki et al.

(10) Patent No.: US 7,585,100 B2
(45) Date of Patent: Sep. 8, 2009

(54) LIGHTING DEVICE FOR DISPLAY

(75) Inventors: Kentaroh Aoki, Mie (JP); Kenichi Iwamoto, Mie (JP); Yoshiki Takata, Mie (JP)

(73) Assignee: Sharp Kabushiki Kaisha, Osaka (JP)

( * ) Notice: Subject to any disclaimer, the term of this patent is extended or adjusted under 35 U.S.C. 154(b) by 306 days.

(21) Appl. No.: 11/054,268

(22) Filed: Feb. 9, 2005

(65) Prior Publication Data

US 2005/0226002 A1 Oct. 13, 2005

(30) Foreign Application Priority Data

Apr. 12, 2004 (JP) ............................ 2004-117295

(51) Int. Cl.
*F21V 7/04* (2006.01)

(52) U.S. Cl. .................. 362/634; 362/632; 362/633; 349/70

(58) Field of Classification Search .......... 362/613, 362/614, 630, 634, 633, 632; 439/233, 236, 439/237; 349/70
See application file for complete search history.

(56) References Cited

U.S. PATENT DOCUMENTS

| | | | | |
|---|---|---|---|---|
| 3,156,841 A | * | 11/1964 | Ayres | 313/49 |
| 3,360,765 A | * | 12/1967 | Strange et al. | 439/612 |
| 4,918,582 A | * | 4/1990 | McIngvale et al. | 362/217 |
| 4,928,210 A | * | 5/1990 | Hayakawa et al. | 362/217 |
| 5,879,203 A | * | 3/1999 | Egle et al. | 439/830 |
| 5,968,397 A | * | 10/1999 | Wyland et al. | 219/540 |
| 6,135,620 A | * | 10/2000 | Marsh | 362/377 |
| 6,960,001 B2 | * | 11/2005 | Nitto et al. | 362/218 |
| 7,172,330 B2 | * | 2/2007 | Lee et al. | 362/634 |
| 2002/0086573 A1 | * | 7/2002 | You | 439/226 |
| 2004/0156183 A1 | * | 8/2004 | Kim | 362/31 |

FOREIGN PATENT DOCUMENTS

| | | |
|---|---|---|
| JP | 4-132178 A | 5/1992 |
| JP | 06-76901 A | 3/1994 |
| JP | 7-22138 A | 1/1995 |
| JP | 2002-258281 A | 9/2002 |
| JP | 2002-260796 | 9/2002 |
| JP | 2002-367422 A | 12/2002 |

OTHER PUBLICATIONS

English translation of the official communication issued in counterpart Japanese Application No. 2004-117295, mailed on Jul. 4, 2006.
English translation of the official communication issued on counterpart Japanese Application No. 2004-117295, mailed on Oct. 10, 2006.

* cited by examiner

*Primary Examiner*—Jacob Y Choi
(74) *Attorney, Agent, or Firm*—Keating & Bennett, LLP

(57) ABSTRACT

An object of the invention is to make a light source and a power supply line detachable easily so as to enable the light source to be replaced easily for maintenance. The invention provides a lighting device for a display, which includes a light source having electrode terminals provided at both ends thereof, connectors attached to the ends of a power supply line for supplying power to the light source, light source-holding chassis placed at the ends of the light source, and insertion portions opened in the chassis. The electrode terminals of the light source are placed inside the insertion portions, and the connectors are fitted detachably in the insertion portions from the outside, whereby the terminals in the connectors are connected to the electrode terminals.

44 Claims, 42 Drawing Sheets

LIGHTING DEVICE FOR DISPLAY

This nonprovisional application claims priority under 35 U.S.C. § 119(a) on Patent Application No(s). 2004-117295 filed in Japan on Apr. 12, 2004, the entire contents of which are hereby incorporated by reference.

BACKGROUND OF THE INVENTION

1. Field of the Invention

The invention relates to a lighting device for a display, and in particular, to a lighting device used for a display in which a light source constituting the lighting device is supplied with power from a power supply line.

2. Description of the Related Art

In recent years, a display called FPD (Flat Panel Display), which is thin and flat, has been developing a larger market comparing with a display in which a CRT (Cathode Ray Tube) is used. Among various types of FPDs, plasma displays and liquid crystal displays are the mainstream. Both have characteristics, respectively. A plasma display utilizes a discharge phenomenon so as to enable a large screen and high luminance. On the other hand, a liquid crystal display can cope with various sizes, and enables a compact size, low power consumption, light weight and high contrast.

A liquid crystal display enabling low power consumption, a thin type, and light weight, and capable of coping with various sizes, as described above, has such a configuration as shown in FIG. 54. That is, on the inner faces of two glass substrates 400A and 400B disposed opposite each other, transparent electrodes 401A and 401B are arranged in grids and orientation films 402A and 402B are arranged, respectively. In between the orientation films 402A and 402B, there is filled a liquid crystal material 403 having a characteristic of changing the orientation of its molecules upon being applied with an electric field so as to change the polarizing characteristics of a light passing, and on the outer sides of the two glass substrates 400A and 400B, polarizing plates 404A and 404B are adhered.

Further, in a color liquid crystal display, a color filter 405 with colors such as R, G, and B is arranged in between the glass substrate 400B on the display side opposite the light disposing side and the transparent electrode 401B. In the liquid crystal display as described above, the liquid crystal material 403 is electrically controlled by a TFT so as to control the polarizing characteristics of a light passing through each element, and to control the passing amount of the light with the polarizing plates. In other words, in the liquid crystal display, a voltage is applied to the liquid crystal material so as to control the polarizing characteristics of light passing therethrough to thereby display images.

As described above, a liquid crystal display is not a self-emitting element which emits light by itself but a passive element which displays images with light from the outside. Lighting devices are widely used for the passive elements as frontlights or backlights.

The invention relates to a lighting device for lighting an apparatus having a display means capable of displaying images with light from the outside as described above, and such a lighting device is referred to as a lighting device for a display herein.

The lighting devices of liquid crystal displays mainly include two types. That is, a vertical (direct) type enabling high luminance, high efficiency and enlargement in size, and an edge light (side light) type enabling reduction in size, reduction in thickness and low power consumption. In the vertical type, lamps are arranged on the rear face of the liquid crystal panel and direct light is used to thereby form flat light sources with high luminance and high efficiency. However, the vertical type has such demerits as a difficulty in reducing thickness and a large power consumption.

On the other hand, in the edge light type, one or more light sources are arranged on a side face of a plate, made of acrylic, called a light guiding plate which diffuses and scatters light to form flat light sources, to thereby realize a reduction in thickness and low power consumption. However, the edge light type has such demerits that the size of the light guiding plate becomes larger as the screen size becomes larger, and the weight becomes heavier. Therefore, the edge light type is adopted in many mobile devices which are small and in which power consumption is a great concern.

The edge light type is further divided into two types, that is, a backlight type in which a lighting device is arranged on the rear face of the liquid crystal display, and a frontlight type in which a lighting device is arranged on the front face so as to utilize reflection light by a reflective or a semi-transmitting (hybrid of reflection and transmission) liquid crystal display.

The service life of a liquid crystal display depends mostly on the service life of the light source. By performing maintenance to replace failed light source to a new one, there is an advantage that a liquid crystal display can be used semi-permanently.

FIG. 55 shows a structure to supply power to a linear light source of an edge light (side light) type backlight. Electrode terminals 2A and 2B protruded from both ends of a linear light source 1 are connected by soldering to core lines of power supply lines 3 and 4 connected to an inverter. The power supply line 3 connected by soldering to the electrode terminal 2B on the GND side (low pressure side) is interconnected so as to return to the HOT side (high pressure side) through the back face side of a reflector 5 surrounding the linear light source 1. Note that a vertical (direct) type backlight also has a similar structure to supply power to a linear light source.

In the aforementioned structure, however, the power supply lines 3 and 4 and the electrode terminals 2A and 2B are connected by soldering, and the power supply line 3 on the GND side is interconnected bypassing the rear face of the reflector 5. Therefore, in a case of maintenance when the linear light source 1 is failed, it is difficult to remove only the linear light source 1, causing a problem of poor performance in maintenance and recycle. In particular, when a lamp, containing mercury which is a harmful substance, is used as a linear light source, it is preferable to solely remove the lamp safely so as to change it to a new one easily. Further, in manufacturing, there is required an operation of soldering the power supply lines 3 and 4 to the electrode terminals 2A and 2B of the linear light source 1, respectively, causing a problem of increasing the number of operations and operational cost.

Considering the aforementioned problems, Japanese Patent Application Laid-open No. 2002-260796 proposes a contact member 6 for connecting a fluorescence tube 9 for backlight and a power supply line 12 without soldering, as shown in FIG. 56.

The contact member 6 has a first hole 15 and a second hole 16 at both ends of a base body 7 made of conductive resin, the outer faces of the base body 7 being covered with a covering member 8. The fluorescence tube 9 for backlight is so configured that an electrode terminal 10 at the tip thereof is outwardly fitted with a conductive member 11, and the power supply line 12 is so configured that a lead wire 13 at the tip thereof is covered with a conductive member 14. The conductive member 11 at the tip of the fluorescence tube 9 for backlight is inserted in the first hole 15, and the conductive member 14 at the tip of the power supply line 12 is inserted in the second hole 16, so that power is supplied to the fluorescence tube 9 for backlight via the base body 7 of the contact member 6.

However, according to the contact member 6 described in the aforementioned publication, it has conductivity with conductive resin, whereby it is less conductive comparing with a metal, causing an energy loss. Further, since the contact member 6 is so configured that the conductive members 11 and 14 of the fluorescence tube 9 for backlight and of the power supply line 12 are inserted in the first hole 15 and the second hole 16, respectively, a problem of low reliability in electrical connection is caused. Further, since it is required to form the conductive members 11 and 14 on the lead wire 13 of the power supply line 12 and on the electrode terminal 10 of the fluorescence tube 9 for backlight, a problem of increasing in the number of operations is caused. Moreover, since the contact member 6, the fluorescence tube 9 for backlight, and the power supply line 12 are not fixed, a problem of low reliability in positioning and holding is caused.

On the other hand, as shown in FIG. 57, in a case of a vertical (direct) type backlight in which a plurality of linear light sources 1 are arranged in parallel, HOT sides (high pressure sides) are placed in concentration on one side, and GND sides (low pressure sides) are placed in concentration on the other side. Thereby, a high luminance area H and a low luminance area G are generated due to a difference in the current densities of the HOT side and the GND side, causing a problem of luminance nonuniformity in the axial direction of the linear light sources 1. In other words, as shown in FIG. 58A, the linear light source 1 has a high potential on the HOT side, but the potential is attenuated to be low on the GND side, whereby a problem of luminance nonuniformity, in which the bright portion and the dark portion are generated, is caused in the display screen 18 of the liquid crystal display as shown in FIG. 58B so that the display definition is deteriorated.

Further, when a current supplied to each linear light source 1 has the same phase, flickers of adjacent linear light sources 1 are in the same frequency, causing a problem that flickers of the backlight as a whole are increased and electrical noises are caused to the liquid crystal panel.

SUMMARY OF THE INVENTION

The invention has been developed in view of the aforementioned problems. An object of the invention is to make a light source and a power supply line detachable easily so as to enable the light source to be replaced easily for maintenance, for example.

In order to achieve the aforementioned object, the invention provides a lighting device for a display, which comprises a light source having a first terminal at least at one end thereof, a power supply line for supplying power to the light source, a connector having a second terminal communicating with the power supply line therein, and a chassis having an insertion portion for the connector. Herein, the connector and the chassis are fitted to each other detachably so as to enable the first terminal and the second terminal to be connected to each other.

With such a configuration, the power supply line is connected to the terminal of the light source detachably via the connector. Therefore, when the light source is failed, for example, the light source is easily removed by only drawing the connector from the terminal of the light source, and can be replaced with a new light source easily. Further, since the connector is fitted and kept in the insertion portion of the chassis so as to be held stably, the light source can be easily removed independently by being drawn to be separated from the connector. Further, since the terminal of the light source and the power supply line are connected by using the connector and without soldering, it is possible to reduce the number of operations and the operational cost for assembling.

Note that the chassis may be formed as a part of a chassis forming the casing of the lighting device or formed as a separate body for holding the light source.

It is preferable that the chassis is provided to at least an end area of the light source.

It is preferable that the second terminal in the connector is a press-contact terminal, and the first terminal protruded at the end of the light source is inserted into the connector whereby the first terminal is press-contacted with and connected to the press-contact terminal.

With such a configuration, a press-contact terminal is used as the connector terminal, whereby a stable electrical connection to the terminal of the light source can be secured. Further, this configuration also contributes to prevent the terminal of the light source from falling off from the connector terminal.

It is preferable that the connector has a locking portion on an outer face of a housing thereof, and the insertion portion for the connector of the chassis has a to-be-locked portion on an inner face thereof, and the connector is fitted into the connector insertion portion, whereby the locking portion is locked to the to-be-locked portion and the connector is fixed to the chassis.

Alternatively, it is preferable that the insertion portion for the connector of the chassis has a locking portion on an inner face thereof, and the connector has a to-be-locked portion on an outer face of a housing thereof, and the connector is fitted into the insertion portion for the connector, whereby the locking portion is locked to the to-be-locked portion and the connector is fixed to the chassis.

With such a configuration, the connector is stably locked and fixed while being fitted in the insertion portion of the chassis. Thereby, the connector is prevented from falling off, so that position shifting or the like can be prevented. Further, even when an operator only draws the light source without holding the connector at the time of replacing the light source, the light source can be easily separated from the connector and easily removed. This improves the operability.

It is preferable that the connector is detached from the insertion portion for the connector by unlocking the locking portion and the to-be-locked portion with an unlocking means.

With such a configuration, by unlocking the connector and the chassis by using the unlocking means, the connector fixed stably can be detached easily at the time of replacing the light source for maintenance. This reduces the operational loads.

It is preferable that the insertion portion of the chassis is also used as a removing port for the light source.

With such a configuration, the light source can be removed through the insertion portion of the chassis which is opened by removing the connector, whereby maintenance can be performed without decomposing the chassis. This enables to reduce the number of operations.

It is preferable that the light source is a linear light source.

Further, it is preferable that the linear light source is a discharge tube formed of a hot cathode tube, a cold cathode tube or a xenon tube, or an LED which is made into a linear light source.

It is preferable that the light sources are a plurality of linear light sources arranged in parallel, and one end sides of at least two or more of the light sources are electrically connected to each other.

With such a configuration, the plural linear light sources arranged in parallel are in the state where they are in the series connected in the folded state, whereby the HOT side (high pressure side) and the GND side (low pressure side) of the terminals of the light sources connected to the connector are arranged on the same side. That is, the HOT side with a large current density and high luminance and the GND side with a small current density and low luminance are arranged on the same side. Therefore, a difference in the current density distribution in the axial direction of the linear light source is offset, so that nonuniformities in the luminance and chromaticity can be reduced.

Further, with the HOT side and the GND side being on the same side, flickers of adjacent light sources can be offset and, also flickers of the entire lighting device can be offset, whereby electrical noise to a liquid crystal panel to be laminated can be reduced.

Alternatively, it is preferable that the light source is curved to be folded so that terminals at both ends are protruded in a same direction.

With such a configuration, the terminals at the both ends of the light source are arranged on the same side similar to the aforementioned configuration whereby luminance nonuniformity can be reduced. Further, this brings an advantage of not requiring an operation to serially connected the light sources to each other.

Specifically, it is preferable that the light source is folded to be in a substantially U-shape or in a substantially W-shape.

It is preferable that the connector has a plurality of terminals, and a plurality of terminals of the light sources are connected collectively to the connector.

For example, in a case where one connector is connected to one terminal of the light source separately, connector fitting operations should be performed for the number of connectors. However, with the above-described configuration, connecting to the connector can be performed collectively in one action even though a number of terminals exist, whereby the number of operations can be reduced.

It is preferable that the lighting device is so configured that the connector and the power supply line are detachable. Herein, a small connector is connected to an end of the power supply line and a mounting hole is formed in a rear face of the connector, and the small connector is fitted into the mounting hole whereby a terminal in the small connector and the terminal in the connector are connected to each other.

With such a configuration, it is possible to remove only the power supply line from the connector by detaching the small connector from the mounting hole.

It is preferable that the small connector has a locking portion on an outer face of a housing thereof and the connector has a to-be-locked portion on an inner face of the mounting hole thereof, and the small connector is fitted into the mounting hole, whereby the locking portion is locked to the to-be-locked portion and the small connector is fixed to the connector.

With such a configuration, it is possible to prevent the small connector from falling off from the connector housing even when a drawing load is applied to the power supply line.

It is preferable that the insertion portion of the chassis is opened in an axial direction of the light source.

With such a configuration, the light source can be slidingly removed trough the insertion portion opened by removing the connector.

It is preferable that the insertion portion of the chassis is opened in a direction orthogonal to an axial direction of the light source.

With such a configuration, operability can be maintained even when a detaching operation of the connector from the axial direction of the light source is difficult due to the mounting space or the like, whereby it is preferable.

It is preferable that the chassis has a removing port for a light source, opened in the axial direction of the light source.

This enables to remove the light source without decomposition by sliding the light source through the removing port after the connector is removed.

It is preferable that the removing port is closed with the connector inserted in the insertion portion.

With such a configuration, the removing port is closed in the state of the connector being inserted and fitted in the insertion portion. This enables to prevent dust or the like being contaminated from the removing port, and this configuration is also fine in safety and appearance.

It is preferable that a housing of the connector is formed of a polymeric material made of resin or silicone rubber.

With such a configuration, the connector has a certain elasticity whereby it is easily attachable/detachable to/from the insertion portion of the chassis. In particular, in a case where locking structure exists between the connector and the insertion portion, the locking portion of the connector is flexed by the elasticity when being attached/detached, whereby locking/unlocking can be performed easily.

It is preferable that a rigid interior member is inwardly fitted into the housing of the connector, and a terminal connected to an end of the power supply line is locked to the interior member.

With such a configuration, the connector is of a hybrid specification in which a rigid interior member is inwardly fitted in the housing. Therefore, even when the elasticity of the connector housing is large, the terminal at the end of the power supply line can be held safely due to the rigid interior member. As for the interior member, metal or resin with rigidity may be preferable.

It is preferable that a housing of the connector is of rectangular cross-section, circular cross-section, triangular cross-section or polygonal cross-section.

With such a configuration, the housing can be formed to be in an optimum shape depending on the number and arrangement of the terminals held in the connector housing and the openable shape of the insertion portion of the chassis.

It is preferable that the connector has a guiding projected portion for positioning on an outer face of a housing thereof, and the insertion portion of the chassis has a guiding groove corresponding to the guiding projected portion.

Alternatively, it is preferable that the insertion portion has a guiding projected portion for positioning, and the connector has a guiding groove, corresponding to the guiding projected portion, on an outer face of a housing thereof.

With such a configuration, the connector is provided with a guiding projected portion for positioning, whereby it is possible to prevent rattling, shifting in a rotating direction or the like in the state of the connector being fitted in the insertion portion.

It is preferable that a locking portion of the connector is formed as a locking projected portion, and a to-be-locked portion of the chassis is formed as a locked groove cut out from an end face of a connector inserting side along an inner face of the insertion portion, and the locked groove has a bent portion, and the connector is inserted in the insertion portion and the locking projected portion is slidingly inserted in the locked groove and then the connector is rotated about an axis, whereby the locking projected portion is locked to the bent portion.

With such a configuration, the connector can be locked and fixed by being rotated about the axis after being inserted in the insertion portion. Thereby, an operator does not have a necessity to push the connector with a large force, so that the operational loads can be reduced. Further, when replacing the light source, the light source can be unlocked by rotating and drawing the connector with the reverse action.

It is preferable that an end of the locked groove has a turned-back portion bent toward a direction opposite to a connector inserting direction.

With such a configuration, in the state of the locking projected portion of the connector being locked to the end of the locked groove, the locking projected portion is positioned at the turned-back portion, Therefore, locking is not easily released even when vibrations or the like are generated. This can prevent the connector from falling off unintentionally.

It is preferable that the bent portion of the locked groove is bent at an obtuse angle.

With such a configuration, the locked groove is formed to be oblique (streamline shape), whereby it is possible to cause the connector to approach/separate from the terminal of the light source along with a rotating operation of the connector tracking the locked groove. This enables to adjust connecting distance between the connector and the electrode terminal.

It is preferable that the locked groove is formed in a spiral shape.

With such a configuration, the connector is rotatingly inserted in the insertion portion so that the locking projected portion tracks the locked groove, whereby the distance between the terminal of the light source and the connector can be adjusted, and also a certain contact pressure can be applied to the terminal. Further, since the locked groove is in a spiral shape, there is an advantage that the connector does not easily fall off even with vibrations or the like.

It is preferable that the press-contact terminal has a pair of elastic tongue pieces opposite each other for press-contacting and holding the terminal of the light source therebetween. Specifically, each of the elastic tongue pieces is preferably folded to be face-to-face from a tip side of the terminal in an inverted U-shape.

With such a configuration, by just inserting the terminal of the light source in between the pair of elastic tongue pieces, the terminal is press-contacted due to the holding forces of the elastic tongue pieces to the opposing side, whereby an electrical connection can be secured stably. Further, when replacing the light source, the electrode terminal can be easily detached from the elastic tongue pieces by just drawing the light source.

Alternatively, it is also preferable that the press-contact terminal has a slot formed by being cut out, into which the terminal of the light source is inserted.

With such a configuration, the terminal of the light source can be press-contacted and connected by just being inserted slidingly into the slot of the terminal.

It is preferable that the press-contact terminal is provided with a substantially cylindrical portion having an axial direction same as that of the light source, and the terminal of the light source is inserted and closely fitted in the substantially cylindrical portion so as to be press-contacted and connected.

With such a configuration, the terminal of the light source is inwardly fitted in the substantially cylindrical portion and pivoted, whereby the terminal and the press-contact terminal can be contacted circumferentially.

In particular, if the substantially cylindrical portion is so configured that the inner space becomes narrower from the tip to the end, the contact pressure can be raised according to the insertion of the terminal of the light source.

It is preferable that the lighting device is a vertical type (direct type) backlight in which the light source is disposed on a rear face side of a display panel via an optical member, and the display is illuminated from the rear face.

With such a configuration, the display panel can be directly illuminated by the light source disposed right below, whereby high luminance can be maintained even in a large screen.

It is preferable that through holes, communicating with the insertion portion, are perforated in the chassis placed orthogonal to both sides of the light sources arranged in parallel, and ends of the light sources are inserted in the through holes so as to be positioned.

With such a configuration, the ends of the light sources are positioned in the through holes, whereby the terminals of the light sources can be aligned with the terminals of the connector fitted in the insertion portions of the chassis.

It is preferable that guiding portion for positioning the light source is protruded from a member on a rear face side of the light source.

With such a configuration, the light source is positioned with the guiding portion, whereby the terminals of the light sources can be aligned with the terminals of the connector fitted in the insertion portion of the chassis when a detaching/attaching operation of the light source is performed.

Alternatively, it is preferable that the lighting device is an edge light (side light) type backlight in which a light guiding plate is disposed on a rear face side of a display panel via an optical member, and the light source is placed on at least one side edge face of the light guiding plate.

Alternatively, it is preferable that the lighting device is an edge light (side light) type front light in which a light guiding plate is disposed on a front face side of a display panel via an optical member, and the light source is placed on at least one side edge face of the light guiding plate.

With such a configuration, light emitted from the light source disposed on a side propagates through the light guiding plate so as to emit light flatly, illuminating the back face or the front face of the liquid crystal panel flatly.

It is preferable that the light source is surrounded by a reflector of substantially U-shaped cross-section, and a holder holding the light source is slidingly fitted into the reflector whereby the light source is positioned.

With such a configuration, the light source is positioned with the holder in the reflector, whereby the terminal of the light source can be aligned with the terminal of the connector fitted in the insertion portion of the chassis.

Further, the lighting device of the invention can be applied to a display which is so configured that a polarization of an electromagnetic wave is electrically controlled.

As described above, in a liquid crystal display, voltage is applied to the liquid crystal material so as to control the polarizing characteristics of light transmitting therethrough. Light is an electromagnetic wave in a visible light range of 380 nm to 780 nm, which is recognized by the human beings. Therefore, the lighting device of the invention can be applied to a display of a system which electrically controls the polarization of the electromagnetic wave, not limited to the electromagnetic wave within the aforementioned range.

An electromagnetic wave consists of a composite wave formed of two waves in an X axial direction and a y axial direction (p wave, s wave). By shifting the phases of the two waves, the waveform of the composite electromagnetic wave (light) can be changed. The lighting device of the invention can be used for a display in which the polarization of the electromagnetic wave is electrically controlled, that is, in the state where the composite waveform can be deformed in various forms.

Further, the lighting device of the invention can be applied to a display which is so configured that the intensity of an electromagnetic wave is controlled by a physical, mechanical shuttering system.

The lighting device of the invention can be applied to a display in which the intensity of an electromagnetic wave (light) is controlled by a physical, mechanical shuttering system, besides the display in which voltage is applied to the liquid crystal and the polarization of the electromagnetic wave (light) is electrically controlled.

In particular, it is preferable that the display panel is a crystal panel, and the display is a liquid crystal display.

The invention also provides a display in which the lighting device, an optical member, and a passive-type display panel without a self-luminous element are laminated.

As obvious from the above description, according to the invention, the power supply line is detachably connected to the terminal of the light source via the connector. Therefore, the light source can be removed by being separated from the power supply line and the like when it is failed. This improves the maintenance and recycling efficiencies. Further, since the connector is fitted in the insertion portion of the chassis so as to be held stably, the light source can be easily removed independently by being drawn to be separated from the connector, which improves the operability. Further, since the electrode terminal of the light source and the power supply line are connected by using the connector and without soldering, it is possible to reduce the number of operations and the operational cost for assembling.

DETAILED DESCRIPTION OF THE PREFERRED EMBODIMENTS

Figure 1:
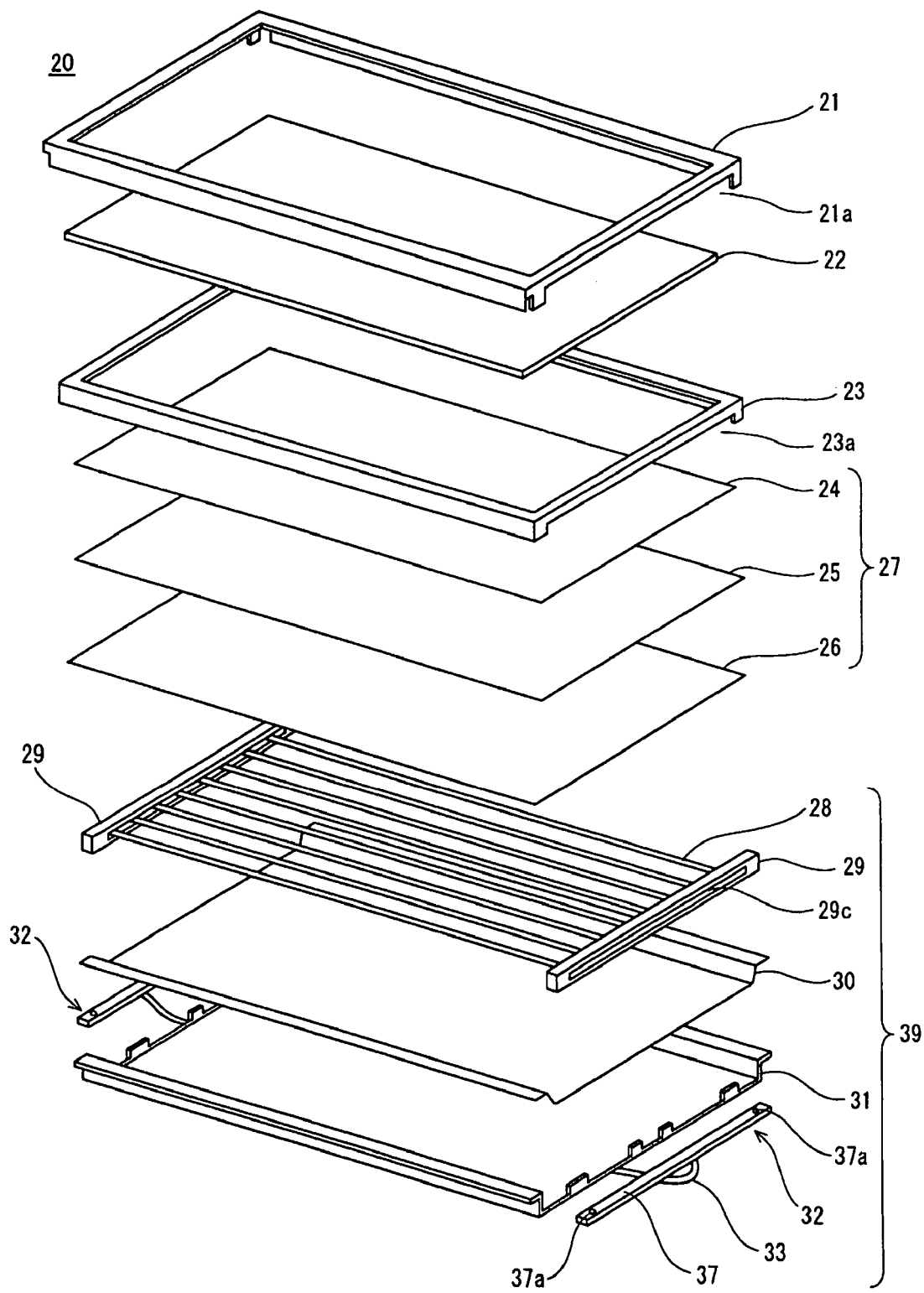
FIG. 1 is an exploded perspective view showing a liquid crystal display of a first embodiment of the invention.

Preferred embodiments of the invention will be described with reference to the drawings.

FIGS. 1 to 5 show a first embodiment.

A display of this embodiment is a liquid crystal display 20, in which the peripheral edges of a liquid crystal panel 22 are held in between a frame-shaped front chassis 23 and a bezel 21, and an optical sheet group 27, which is an optical member, is placed under the liquid crystal panel 22. Under the optical sheet group 27, a plurality of linear light sources 28 are arranged in parallel, and the ends 28a and 28b of each linear light source 28 are held by light source-holding chassis 29. In such a state, the liquid crystal display 20 is closed from the bottom with a reflecting composite member 30 and a back chassis 31. To the end of a power supply line 33 connected to an inverter 36 disposed on the rear face side of the back chassis 31, a connector 32 is connected. This connector 32 is inserted and inwardly fitted in an insertion portion 20c of the light source-holding chassis 29 to thereby supply power to the linear light sources 28.

As the linear light source 28, a cold-cathode tube, having electrode terminals 28a and 28b serving as first terminals and protruded therefrom at the ends, is used.

The light source-holding chassis 29 is a resin molded article. A pair of light source-holding chassis are arranged so as to position and hold the both ends 28a of a number of linear light sources 28 collectively. In each of the light source-holding chassis, a through hole 29e for positioning and holding a linear light source 28 penetrating therethrough is formed in the inner face 29b thereof facing the other chassis, and an insertion portion 29c is formed in the outer face 29a to communicate with the through hole 29e so as to open in the axial direction of the linear light source 28. Further, the top and bottom faces of the insertion portion 29c are provided with recessed to-be-locked portions. On the inner side of the lower end of the light source-holding chassis 29, a cut-out portion 29f for positioning the end of the reflecting composite member 30 is formed.

In the connector 32, a press-contact terminal 38, which is press-fixed to the power supply line 33 and serves as a second terminal, is locked and fixed in a housing 37.

Figure 2:
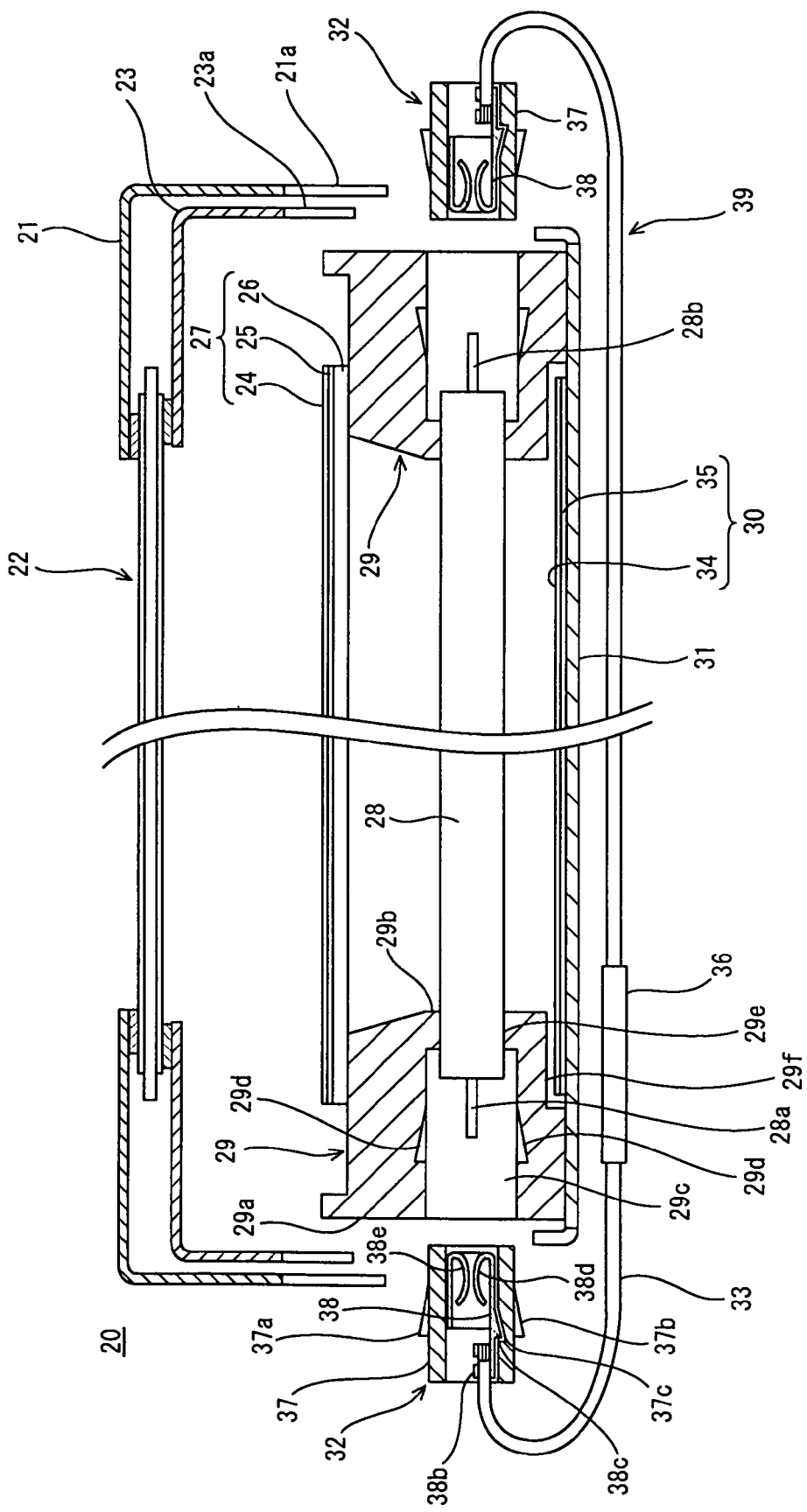
FIG. 2 is an exploded sectional view showing the liquid crystal display of the first embodiment.
Figure 5:
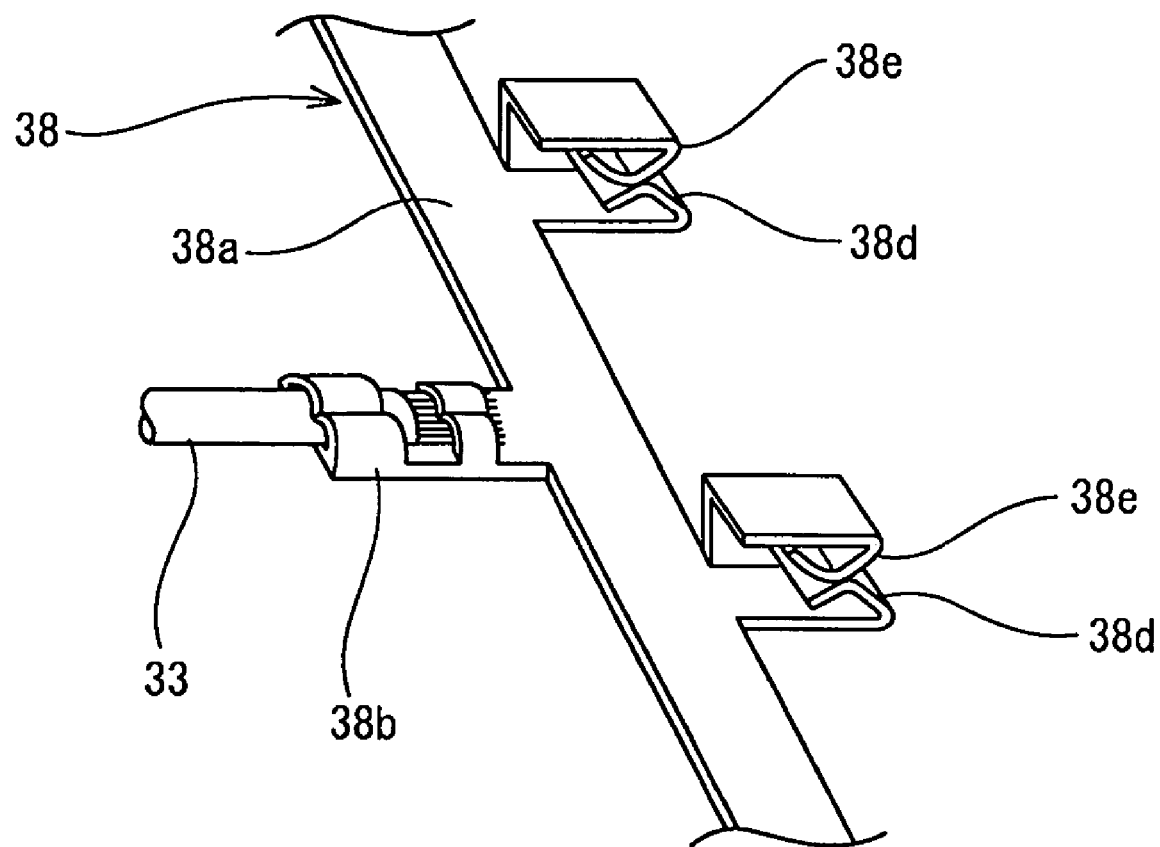
FIG. 5 is a perspective view showing the main part of a terminal in the connector of the first embodiment.

The press-contact terminal 38 is made of metal. As shown in FIGS. 2 and 5, the press-contact terminal 38 has, on a part of the back end side of the substrate 38a, a barrel 38b to which the core line of the power supply line 33 is press-fixed by caulking, and has a pair of elastic tongue pieces 38d and 38e formed by being folded in an inverted U-shape from the front end side of the substrate 38a. The pair of elastic tongue pieces 38d and 38e are provided in plural corresponding to the electrode terminals 28a and 28b. Further, on the lower face of the substrate 38a, a lance 38c for locking the housing 37 is cut and raised.

The housing 37 is made of a polymeric material such as resin. As shown in FIG. 2, on the outer top and bottom faces, locking portions 37a and 37b are protrudingly formed, and in the lower face of the terminal accommodating space, a concave portion 37c for locking the lance 38d of the press-contact terminal 38 is formed. It is also preferable that the housing 37 is made of resin, a rubber material or the like.

The optical sheet group 27 is a resin sheet for diffusing and collecting transmitted light. The optical sheet group 27 is so configured that a diffusing sheet 24, a prism sheet 25, and a diffusing sheet 26 are laminated in this order from the top layer to the bottom layer, but may be configured with any number of sheets or any combination. For example, it may be so configured that DBEF-D, a prism sheet, and a diffusing sheet are laminated in this order from the top layer to the bottom layer.

As the reflecting composite member 30, the "ALSET" (produced by Mitsubishi Jushi Inc.) having a reflectivity of not less than 90%, which is so formed that a reflecting sheet 34 made of resin is adhered to the upper face of a metal film 35 made of aluminum or the like, is used.

The back chassis 31 is made of metal, serving to improve the intensity of the device and to discharge heat.

The bezel 21 is in a frame-shape of inverted L-shape cross-section, and openings 21a are formed at positions corresponding to the insertion portions 29c, in the side faces thereof.

The front chassis 23 is in a frame-shape of inverted L-shaped cross-section, and openings 23a are formed at positions corresponding to the insertion portions 29c, in the side faces thereof.

Figure 3:
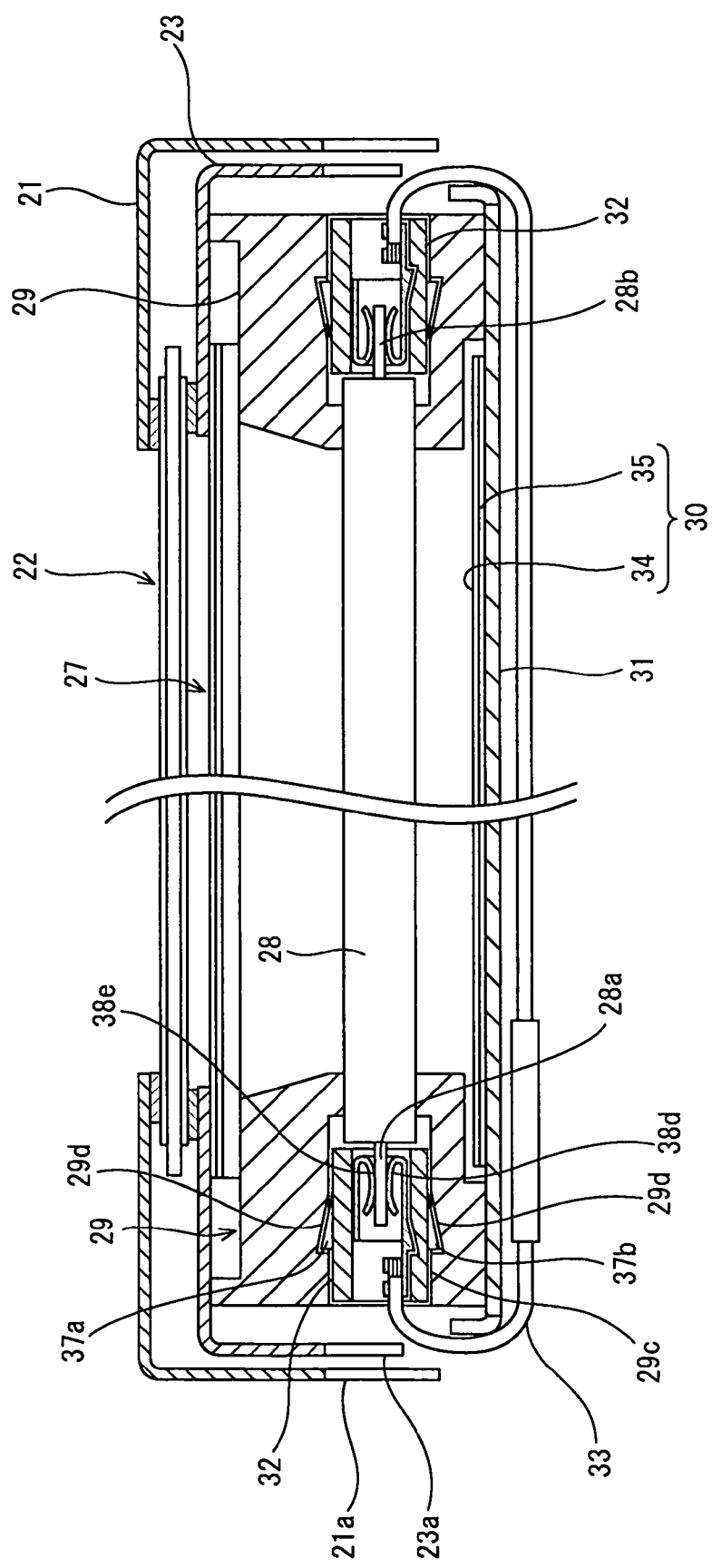
FIG. 3 is a sectional view showing the liquid crystal display of the first embodiment.
Figure 4:
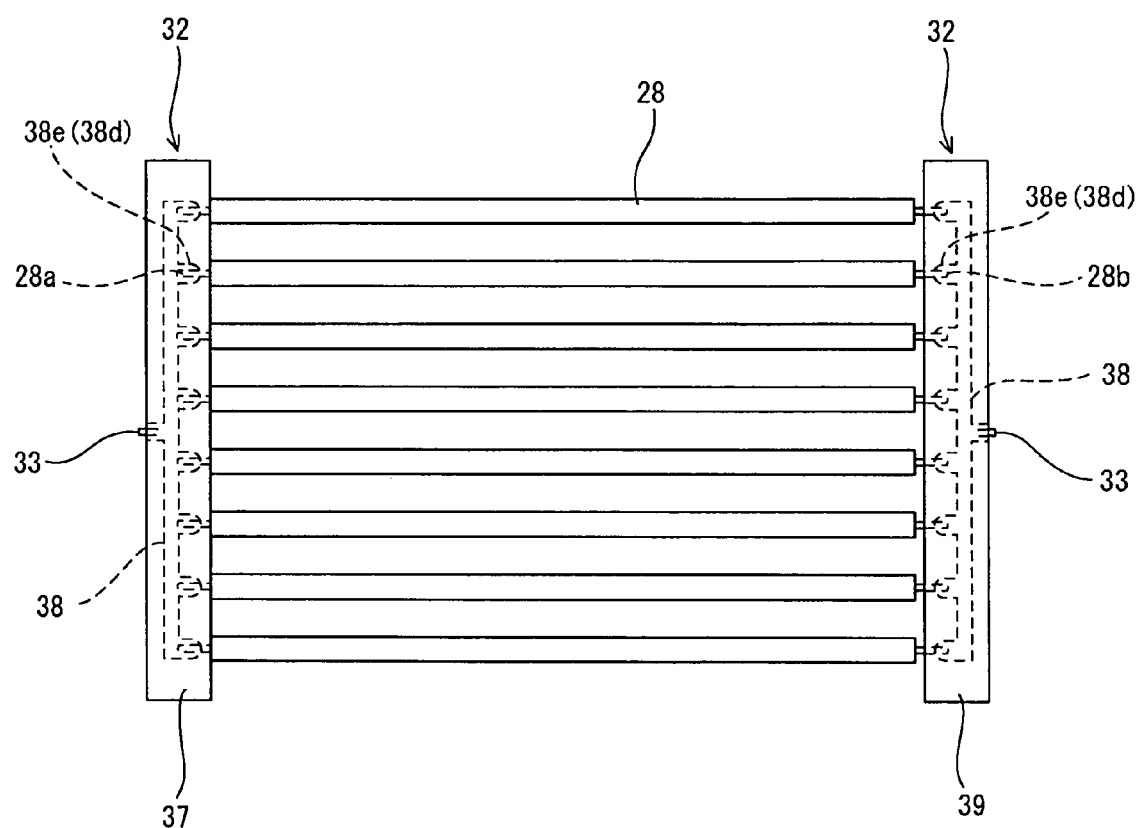
FIG. 4 is a plan view showing the connection between a light source and a connector of the first embodiment.

The liquid crystal display 20 is assembled in the following manner. As shown in FIG. 2, both ends of the linear light sources 28 are inserted through and held by the through holes 29e of the light source-holding chassis 29 so that the electrode terminals 28a and 28b are protruded into the insertion portions 29c, and the connector 32 connected to the end of the power supply line 33 is inserted and inwardly fitted in the insertion portion 29c from sideward. Then, as shown in FIGS. 3 and 4, all electrode terminals 28a and 28b are press-contacted and interposed so as to be connected electrically with the elastic tongue pieces 38d and 38e of the terminal 38 in the connector 32, and the locking portions 37a and 37b of the housing 37 in the connector 32 are locked and fixed to the to-be-locked portion 29d of the light source-holding chassis 29.

When a linear light source 28 is failed, the maintenance procedure for replacing it with a new one is, pulling out the connector 32 from the insertion portion 29c so as to flex and unlock the locking portions 37a and 37b made of resin and to draw the connector 32, whereby the connector 32 and the linear light source 28 are separated easily. Since the bezel 21 and the front chassis 23 have the openings 21a and 23a at the positions corresponding to the insertion portion 29c, the connector 32 can be detached without decomposing the bezel 21 and the front chassis 23.

Then, one end of the linear light source 28 is taken out to the outside through the insertion portion 29c of the light source-holding chassis 29. In other words, the insertion portion 29c are also used as a port for removing the linear light source 28. Next, a new linear light source 28 is slidingly inserted into the inside through the insertion portion 29c in the reverse procedure to the aforementioned procedure, and the electrode terminal 28a at the other end of the linear light source 28 is connected to the connector 32 waiting on the other side, then the connector is again inserted and inwardly fitted in the insertion portion 29c of one side. In this way, a replacement operation is completed. Of course, a replacement operation of the linear light source 28 may be performed by decomposing the light source-holding chassis 29, without passing it through the insertion portion 29c.

Figure 6A:
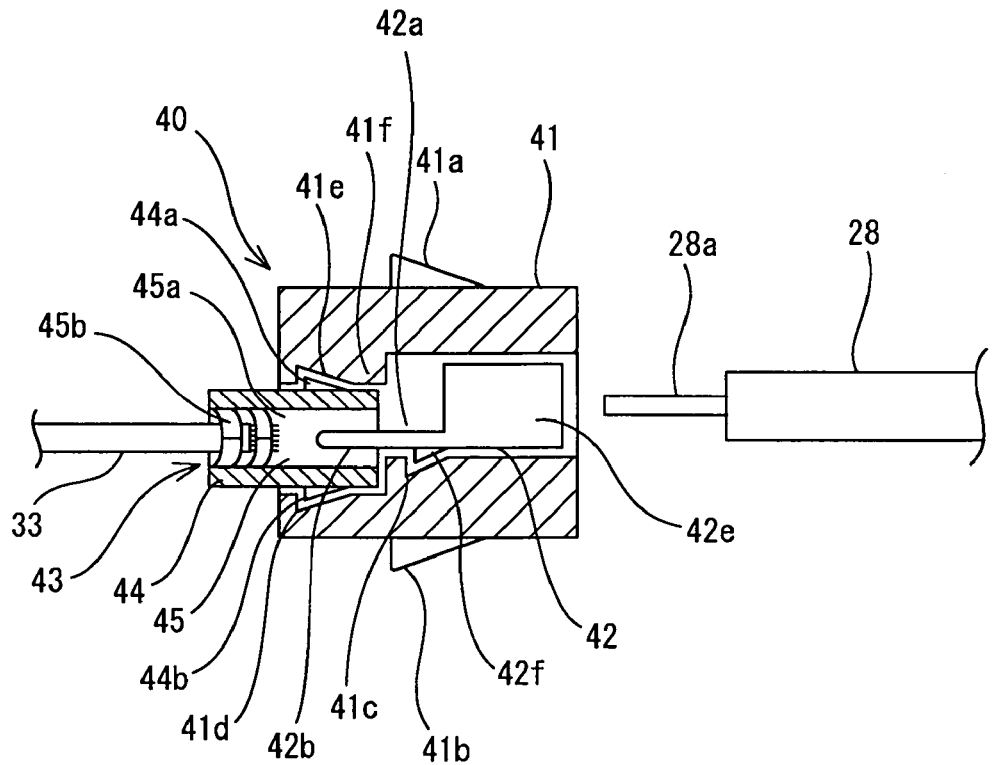
FIG. 6A is a sectional view showing a connector of a second embodiment.
Figure 6B:
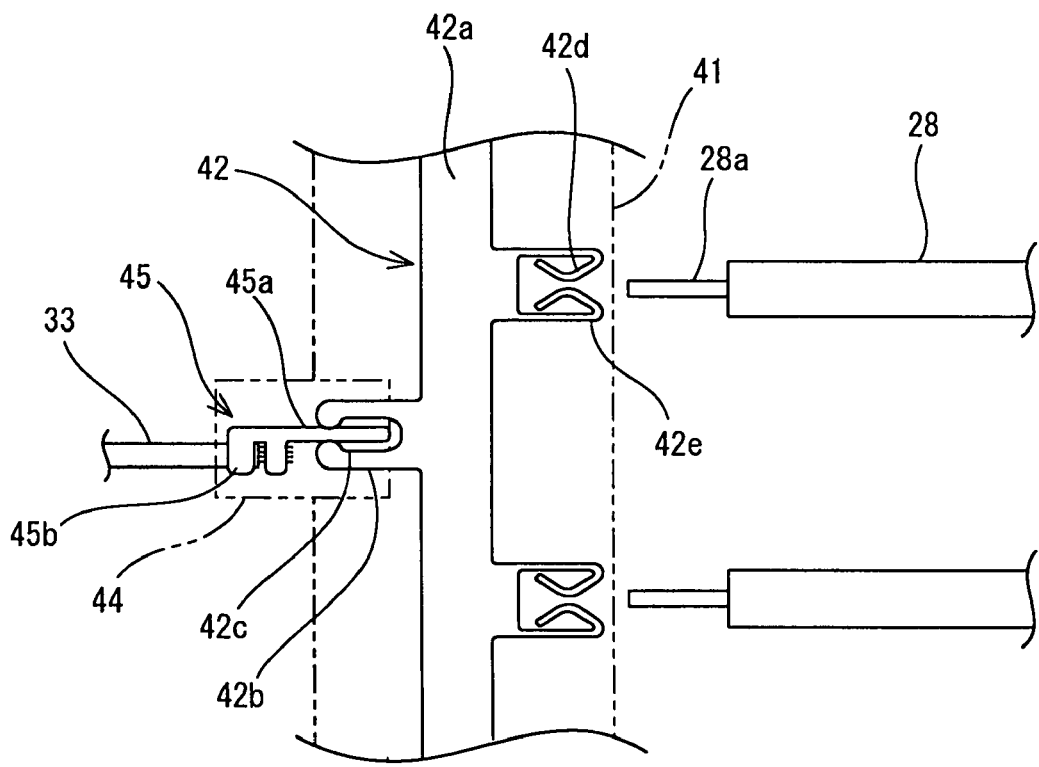
FIG. 6B is a plan view showing the connector.

FIGS. 6A and 6B show a second embodiment.

In this embodiment, a connector 40 and a power supply line 33 are detachable. That is, the end of the power supply line 33 is connected to a small connector 43 which is inwardly fitted in and locked to a mounting hole 41f of the connector 40.

The housing 41 of the connector 40 is provided with locking portions 41a and 41b on the upper and lower outer faces thereof, and a concave portion 41c in the inner face thereof. The backward side forms the mounting hole 41f for the small connector 43, and a to-be-locked portion 41d is provided on the inner face of the mounting hole 41f. A press-contact terminal 42 has, on a part of the back end side of the substrate 42a, a press-contact tub 42b in which a slot 42c is cut out, and has a pair of elastic tongue pieces 42d and 42e formed by being folded from the front end side of the substrate 42a, to be face-to-face in an inverted U-shape. The pair of elastic tongue pieces 42d and 42e are provided in plural corresponding to the electrode terminals 28a and 28b. Further, on the lower face of the substrate 42a, a lance 42f to which the concave portion 41c of the housing 41 is locked is cut and raised.

The housing 44 of the small connector 43 is provided with locking portions 44a and 44b on the upper and lower outer faces thereof. A tab-shaped terminal 45 locked in the small connector 43 has a barrel 45b for press-fixing the power supply line 33 on the back end of the substrate 45a.

The small connector 43 is fitted in the mounting hole 41f of the connector 40, and the locking portions 44a and 44b are locked and fixed to the to-be-locked portions 41d and 41e, whereby the tab-shaped terminal 45 is press-contacted with and connected to the slot 42c of the press-contact terminal 42. Other configurations are similar to those of the first embodiment, so their explanations are omitted.

Figure 7:
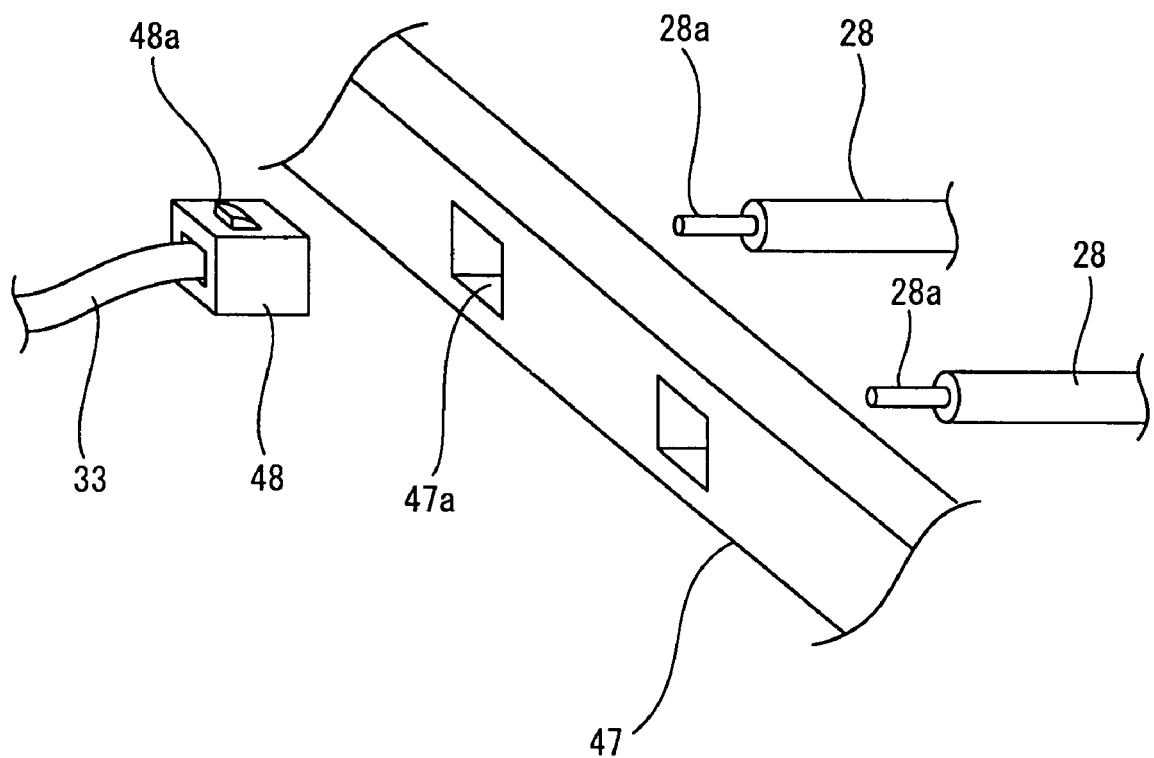
FIG. 7 is a perspective view showing the main part of a third embodiment.

FIG. 7 shows a third embodiment.

In this embodiment, a number of connectors 48, connected to the power supply line 33, are provided corresponding to the number of linear light sources 28 so as to be provided one by one.

A light source-holding chassis 47 has a number of insertion portions 47a perforated corresponding to the number of linear light sources 28. Each connector 48 is inserted and inwardly fitted in an insertion portion 47a so that a locking portion 48a is locked and fixed to a to-be-locked portion (not shown) in the inner face of the insertion portion 47a. Other configurations are similar to those of the first embodiment, so their explanations are omitted.

Figure 8:
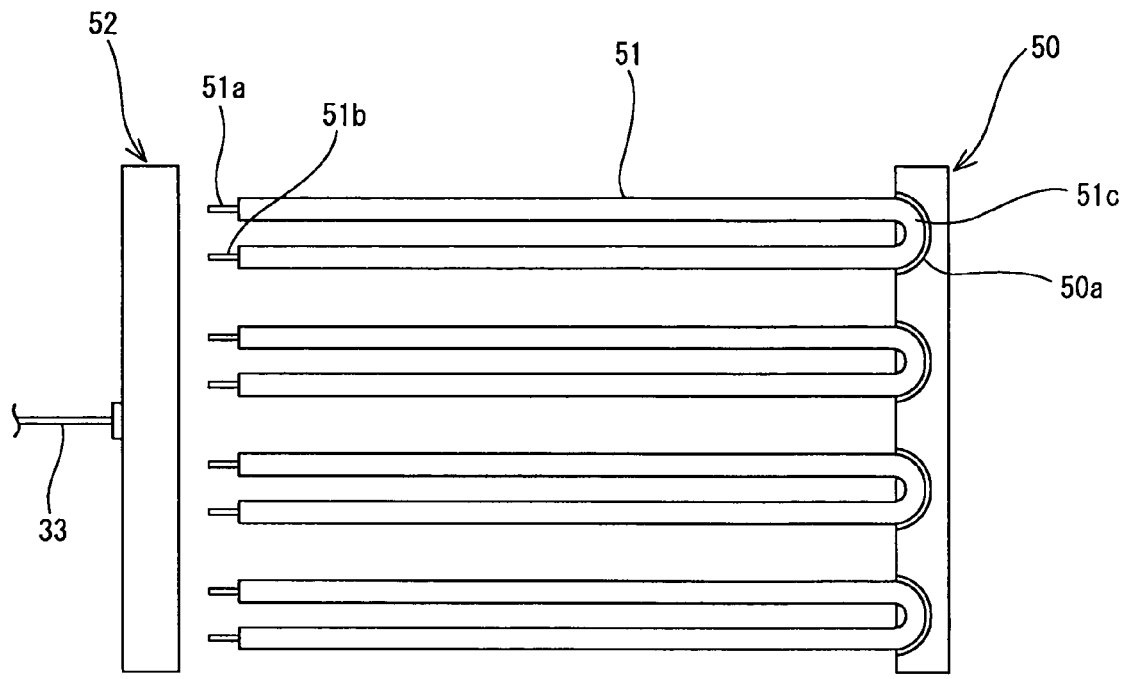
FIG. 8 is a plan view showing a fourth embodiment.
Figure 9:
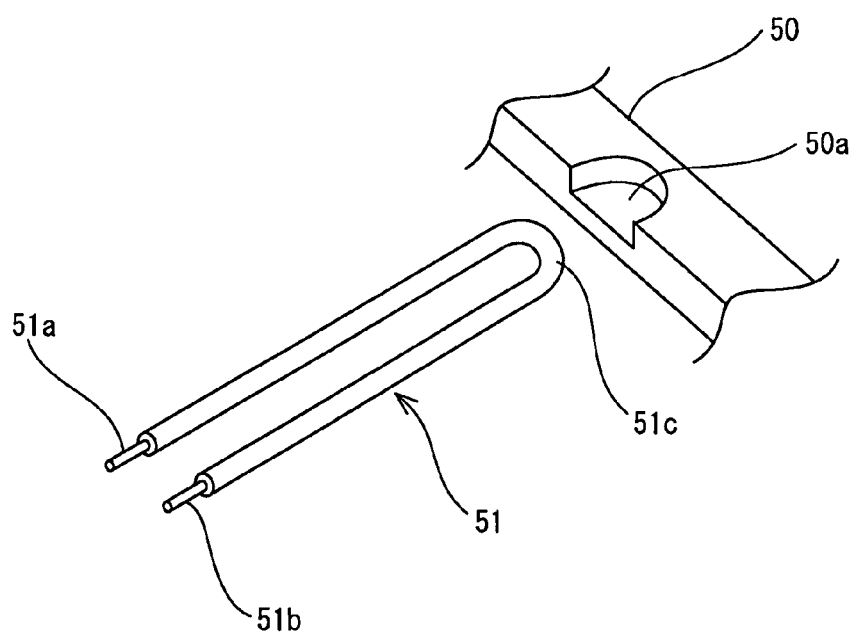
FIG. 9 is a perspective view showing the main part of the fourth embodiment.

FIGS. 8 and 9 show a fourth embodiment.

In this embodiment, a linear light source 51 is folded in a substantially U-shape and bent, whereby electrode terminals 51a and 51b at both ends are protruded in the same direction.

The bent portion 51c of the linear light source 51 is mounted on a concave portion 50a formed by cutting out in the upper face side of a supporting member 50, facing another supporting member, and is fitted in and connected to the electrode terminals 51a and 51b by a connector 52 connected to the power supply line 33.

Figure 10:
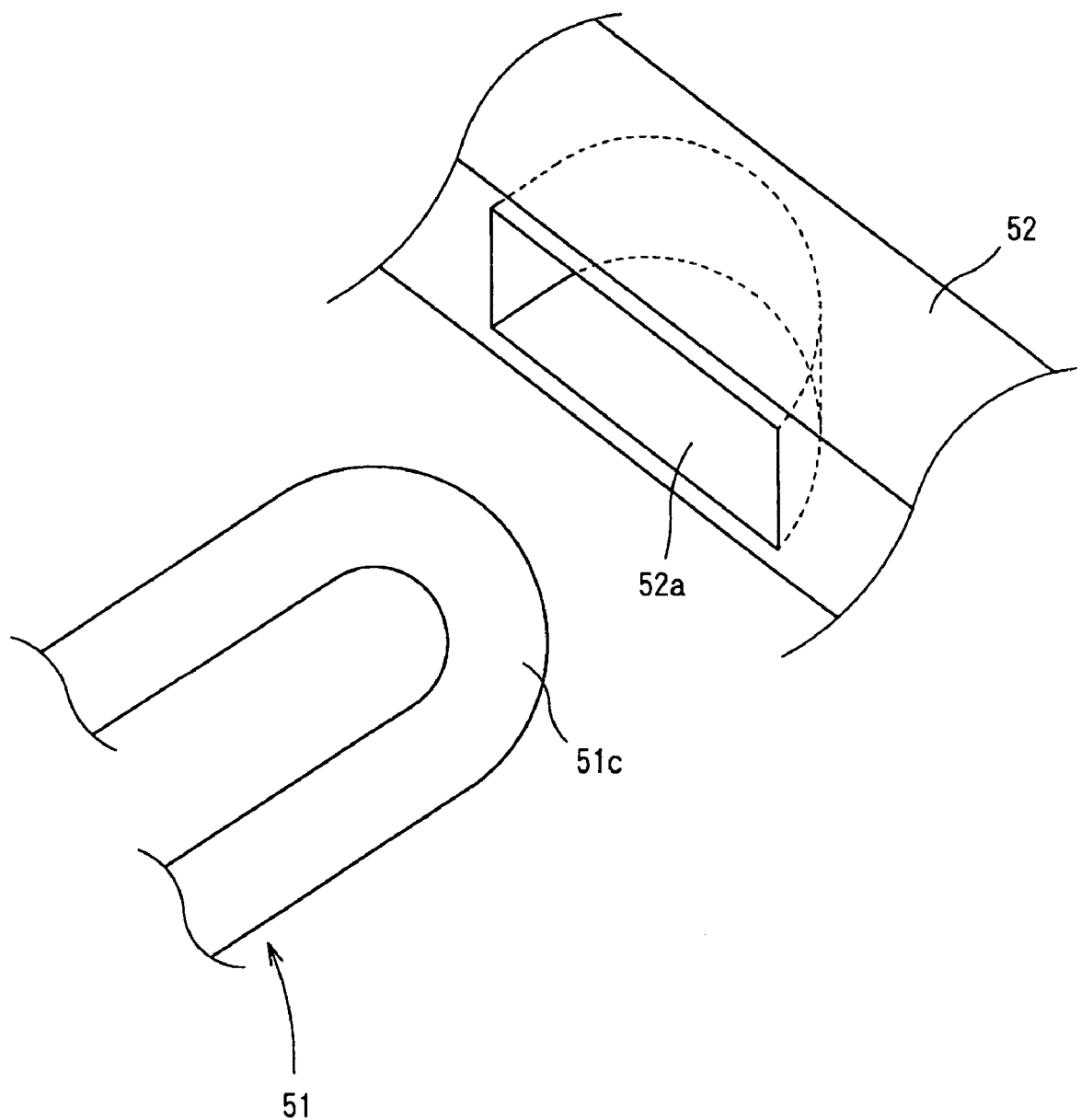
FIG. 10 is a perspective view showing the main part of a modification.

As a modification of the supporting member 52, a mounting hole 52a for inserting and fixing the bent portion 51c of the linear light source 51 may be formed as a concave portion recessed from the opposing face of the supporting member 52, as shown in FIG. 10.

With the configuration described above, the electrode terminal 51a on the HOT side (high pressure side) and the electrode terminal 51b on the GND side (low pressure side) are protruded in the same direction, whereby the HOT side with a large current density and high luminance and the GND side with a small current density and low luminance are arranged on the same side. Therefore, a difference in the current density distribution in the axial direction of the linear light source 51 is offset, so that flickers of the linear light source 51 are suppressed and nonuniformities in the luminance and chromaticity are reduced as a whole. Further, with the HOT side and the GND side being on the same side, flickers of adjacent light sources are offset, whereby electrical noise to the liquid crystal panel 22 to be laminated are also reduced. Other configurations are similar to those of the first embodiment, so their explanations are omitted.

Figure 11:
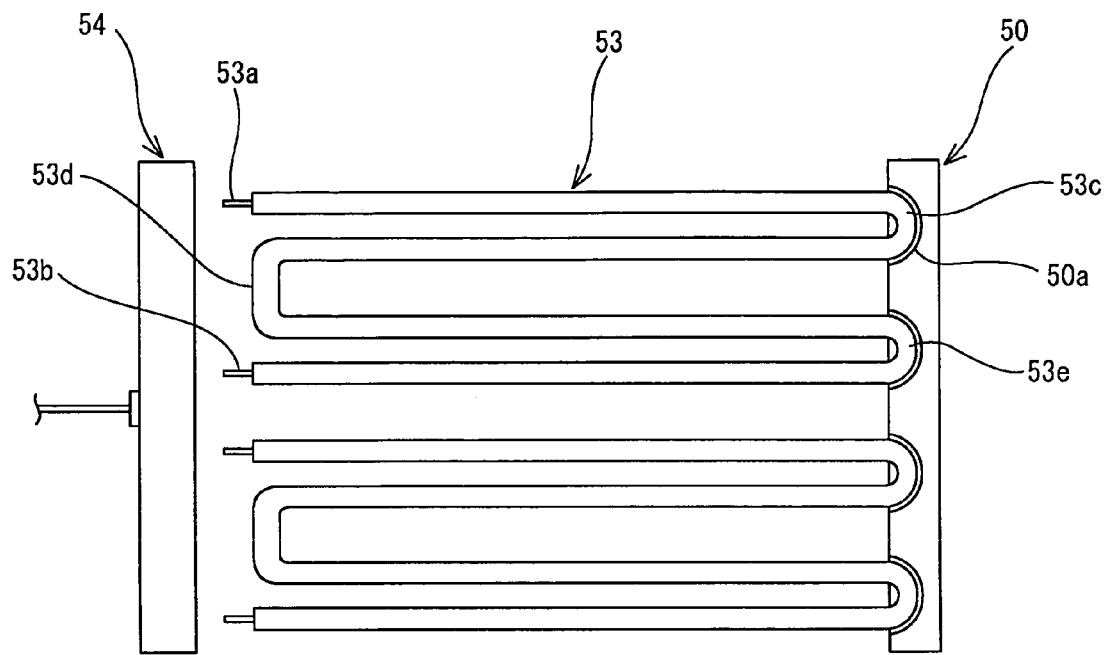
FIG. 11 is a plan view showing a fifth embodiment.

FIG. 11 shows a fifth embodiment.

In this embodiment, a linear light source 53 includes three bent portions 53c, 53d and 53e so as to be curved in a substantially W-shape, whereby electrode terminals 53a and 53b at both ends are protruded in the same direction.

The bent portions 53c and 53e at the opposite side to the electrode terminals 53a and 53b are mounted on the concave portion 50a of the supporting member 50, and are fitted in and connected to the electrode terminals 53a and 53b by a connector 54 connected to the power supply line 33. Other configurations are similar to those of the first embodiment, so their explanations are omitted.

Figure 12:
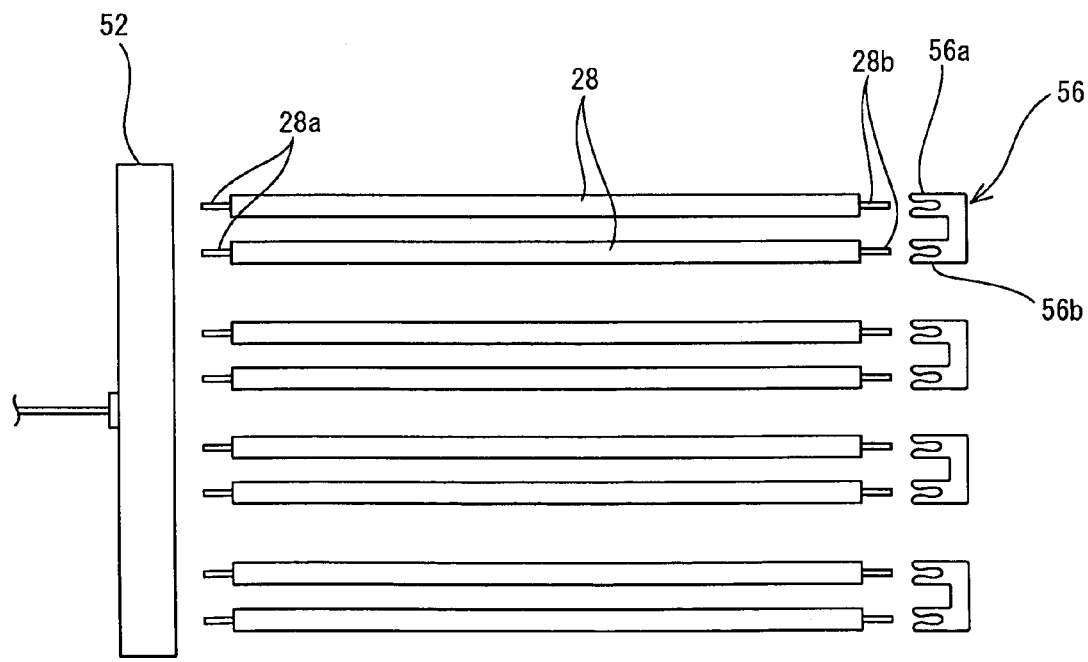
FIG. 12 is a plan view showing a sixth embodiment.

FIG. 12 shows a sixth embodiment.

In this embodiment, adjacent linear light sources 28, in forms of straight lines, are formed to be an artificial U-shaped tube by connecting electrode terminals 28b of other ends to each other with a press-contact tub 56a of a joint bus bar 56. Note that a member for connecting the electrode terminals 28b is not limited to the joint bus bar 56, and may be an electric wire or a substrate. Other configurations are similar to those of the first embodiment, so their explanations are omitted.

FIGS. 13 to 16 show a seventh embodiment.

In this embodiment, an insertion portion 58c of a light source-holding chassis 58 is opened in a direction orthogonal to the axial direction of the linear light source 28.

The light source-holding chassis 58 has a through hole 58e for holding a light source perforated from the inside face 58b, and an insertion portion 58c perforated from the lower face 58a communicating with the through hole 58e, whereby a port 58f for removing a light source is opened from the outside face. Further, in the upper face of the insertion portion 58c has a concave portion 58g in which a projected portion 61g of a connector 60, described later, is fitted.

In a back chassis 59, an opening 59a communicating with the insertion portion 58c is perforated.

Figure 13:
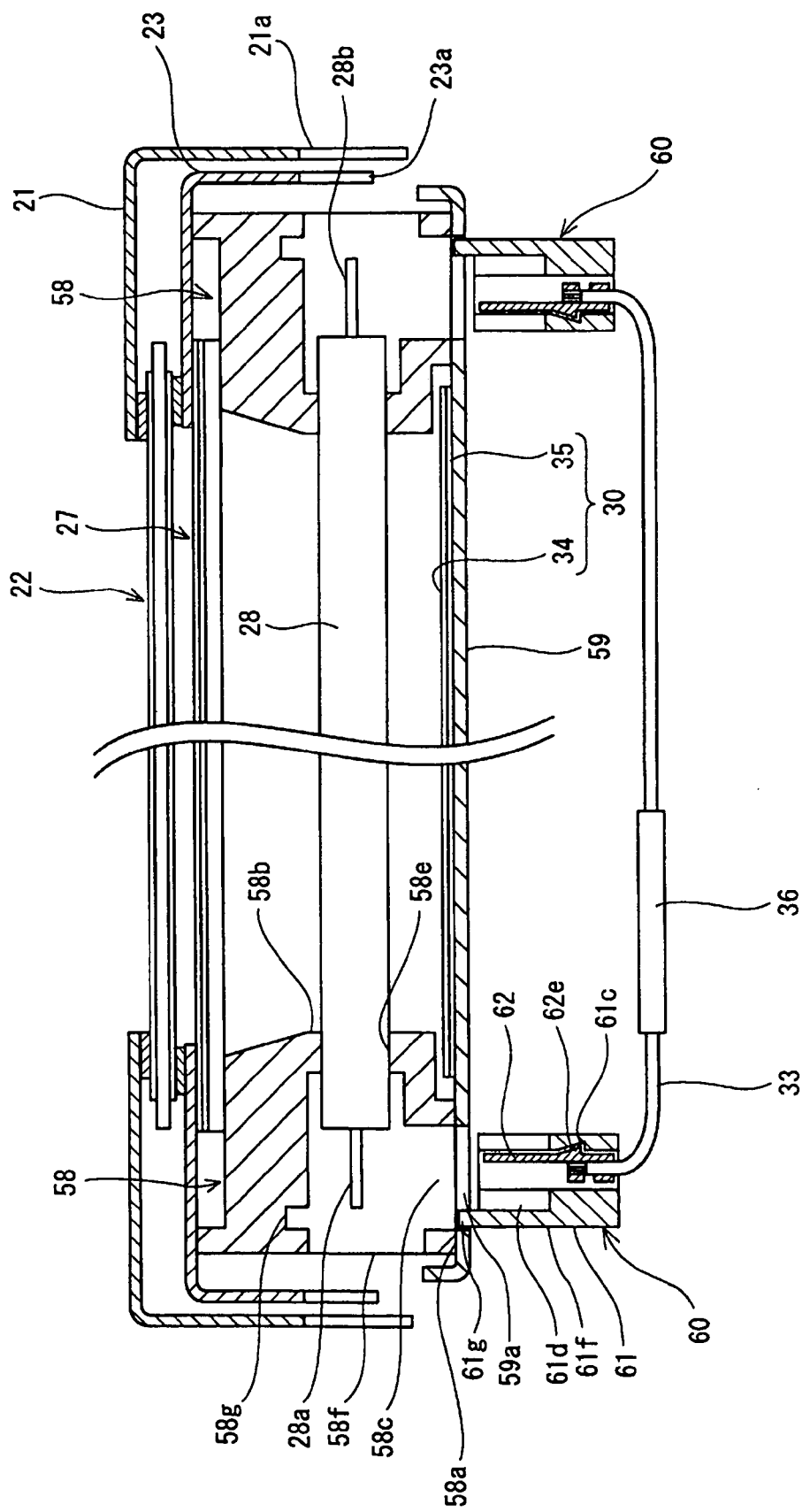
FIG. 13 is an exploded sectional view showing a liquid crystal display of a seventh embodiment.
Figure 14:
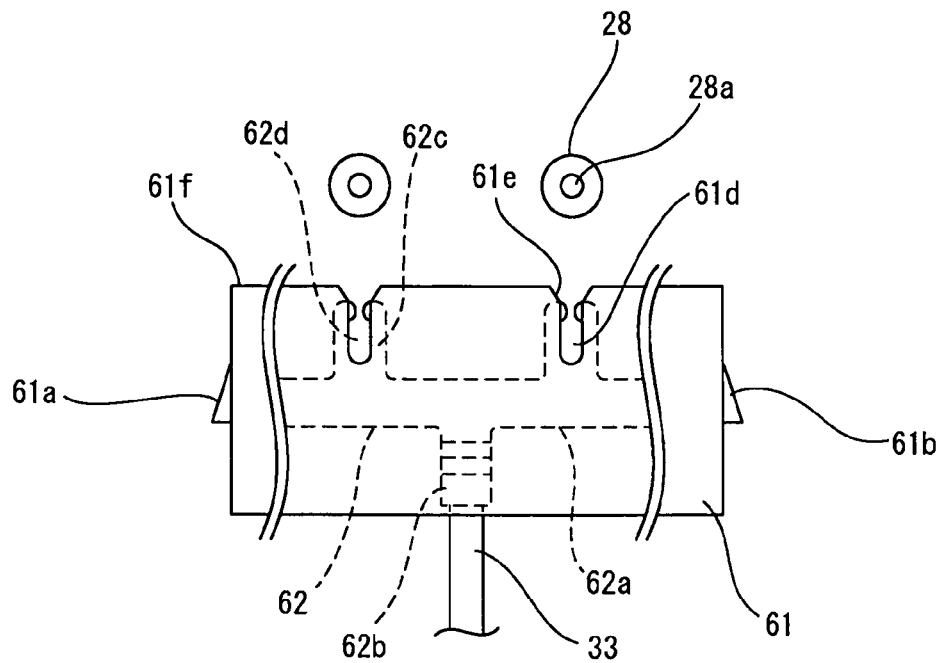
FIG. 14 is a side view showing a connector of the seventh embodiment.

As shown in FIGS. 13 and 14, the connector 60 serves to lock and fix the press-contact terminal 62 press-fixed to the power supply line 33 in the housing 61.

The press-contact terminal 62 has, on a part of the back end side of the substrate 62a, a barrel 62b to which the core line of the power supply line 33 is press-fixed by caulking, and has a number of press-contact tubs 62c, each of which has a slot 62d, protruded from the tip side of the substrate 62a, corresponding to the electrode terminals 28a and 28b. Further, on the lower face of the substrate 62a, a lance 62e for locking the housing 61 is cut and raised.

The housing 61 is made of resin or silicone rubber. The housing 61 has locking portions 61a and 61b protruded on the side end faces, and has a concave portion 61c, to which the lance 62c of the press-contact terminal 62 is locked, formed in the inner face of the terminal accommodating space. Further, a slot 61d is cut out at a position corresponding to the slot 62d of the press-contact tub 62c, and the upper ends of the both sides of the slot 61d are formed to have a bring-in tapered portion 61e. The slot 61d is so configured that the outer side is closed with a closing face 61f, and a projected portion 61g is formed on the upper tip side of the closing face 61f.

Figure 15A:
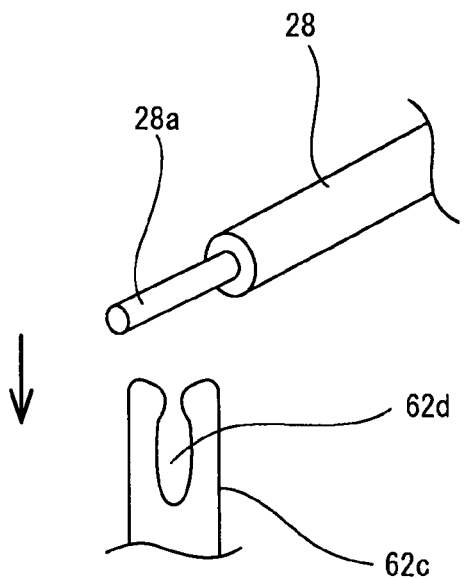
FIGS. 15A and 15B are views showing the connection between an electrode terminal of a light source and a connector terminal of the seventh embodiment.
Figure 15B:
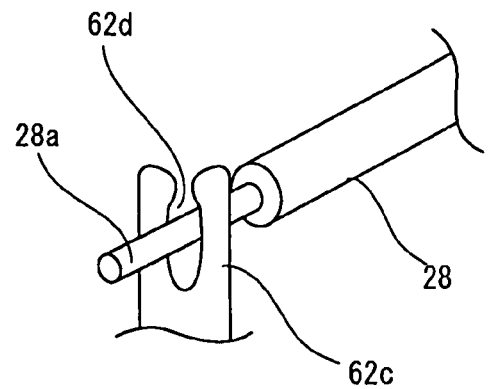
Figure 16:
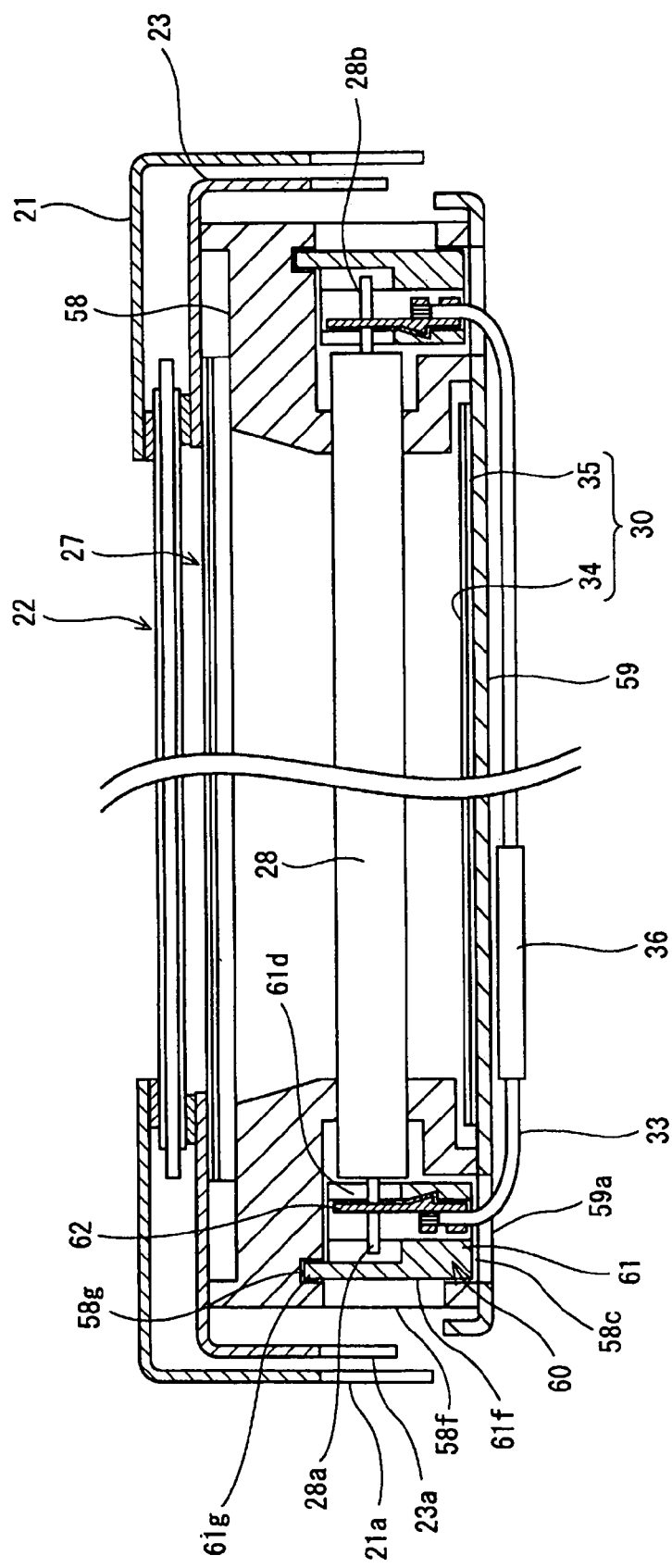
FIG. 16 is a sectional view showing the liquid crystal display of the seventh embodiment.

The assembling procedure is as follows. Both ends of the linear light sources 28 are inserted through and held by the through holes 58e of the light source-holding chassis 58 so that the electrode terminals 28a and 28b are protruded into the insertion portions 58c. Then, as shown in FIG. 16, the connector 60 connected to the end of the power supply line 33 is inserted and inwardly fitted in the insertion portion 58c from the lower side through the opening 59a of the back chassis 59. Then, as shown in FIGS. 15A and 15B, electrode terminals 28a and 28b are press-contacted and interposed so as to be connected electrically with the slot 62d of the press-contact terminal 62 in the connector 60, and the locking portions 61a and 61b of the housing 61 in the connector 60 are locked and fixed to the to-be-locked portion (not shown) provided on the inner face of the insertion portion 58c, and the projected portion 61g is fitted in the concave portion 58g so that the removing port 58f is closed with the closing face 61f.

The replacement procedure of the linear light source 28 is as follows. The connector 60 is pulled downward from the insertion portion 58c through the opening 59a of the back chassis 59 to thereby flex and unlock the locking portions 61a and 61b and to draw the connector 60, whereby the connector 60 and the linear light source 28 are separated.

Then, the linear light source 28 is replaced with a new one through the openings 21a and 23a of the bezel 21 and the front chassis 23, and through the removing port 58f of the light source-holding chassis 58. Then, assembling is performed in the reverse procedure to that described above, whereby the replacement operation will be completed. Other configurations are similar to those of the first embodiment, so their explanations are omitted.

Figure 17:
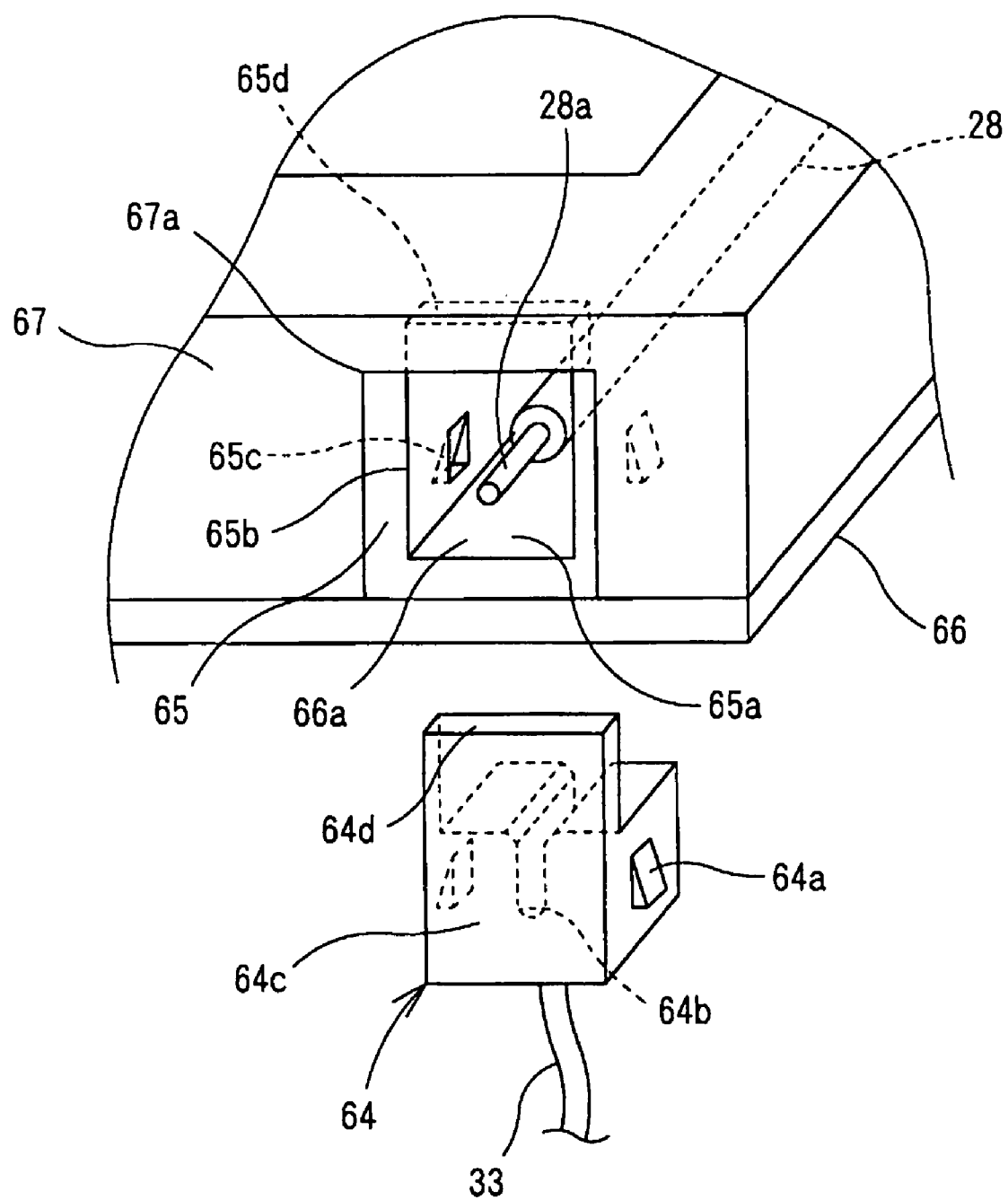
FIG. 17 is a perspective view showing the main part of an eighth embodiment.

FIG. 17 shows an eighth embodiment.

In this embodiment, a number of connectors 64, connected from the lower side as similar to that of the seventh embodiment, are provided corresponding to the number of linear light sources 28 so as to be provided one by one.

A light source-holding chassis 65 has a number of insertion portions 65a perforated separately from the lower side, corresponding to the number of linear light sources 28. Each connector 64 is inserted and inwardly fitted in an insertion portion 65a from the lower side through an opening 66a perforated in the back chassis 66 at a position corresponding to the insertion portion 65a, so that a locking portion 64a is locked and fixed to a to-be-locked portion 65c on the inner face of the insertion portion 65a, and the electrode terminal 28a is slidingly fitted in a slot 64b of the connector 64. At this time, a projected portion 64d on the tip side of the connector 64 is fitted in a concave portion 65d of the light source-holding chassis 65, and a removing port 65d is closed with a closing face 64c of the connector 64, whereby an opening 67a of a bezel 67 is also closed with the connector 64. Other configurations are similar to those of the first embodiment, so their explanations are omitted.

Figure 18:
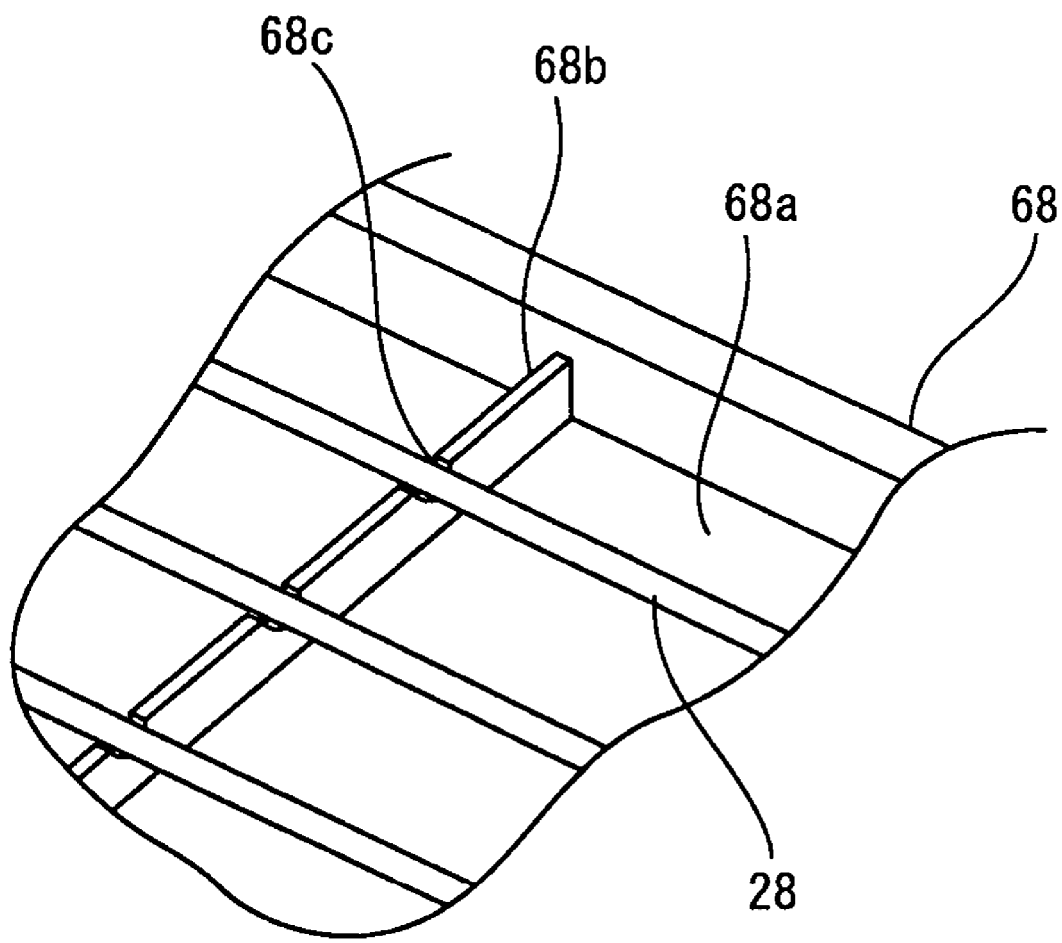
FIG. 18 is a perspective view showing the main part of a ninth embodiment.

FIG. 18 shows a ninth embodiment.

This embodiment can be applied to all of the aforementioned embodiments. On the bottom face 68a of a reflecting composite member 68 positioned on the rear face side of the linear light source 28, a protruded strip 68b is formed in a direction orthogonal to the linear light source 28. The upper end of the protruded strip 68b has guiding portions 68c for positioning light sources, cut out at predetermined intervals.

With this configuration, when detaching the linear light source 28, it is possible to align the electrode terminals 28a and 28b of the linear light source 28 with terminals of the connector. Other configurations are similar to those of the aforementioned embodiments, so their explanations are omitted.

Figure 19:
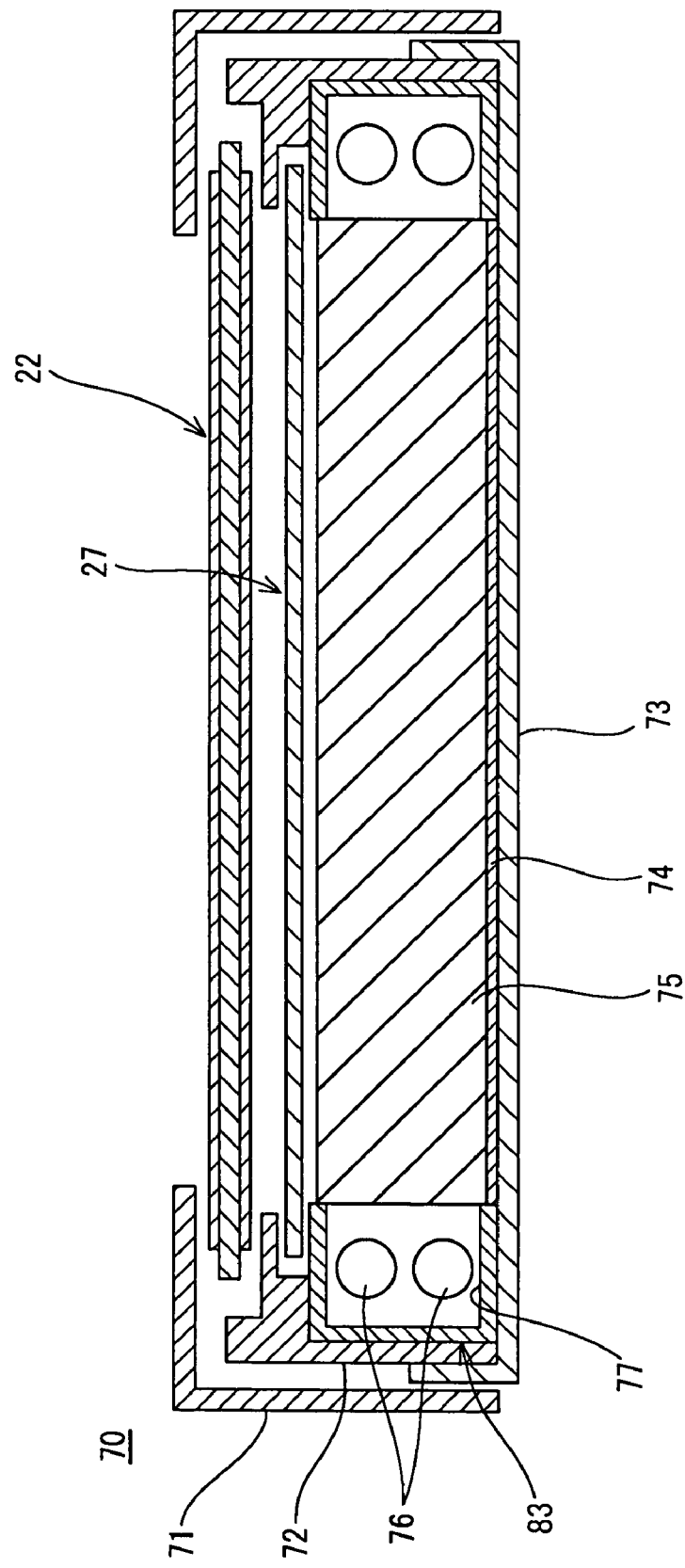
FIG. 19 is a sectional view showing a liquid crystal display of a tenth embodiment.
Figure 20:
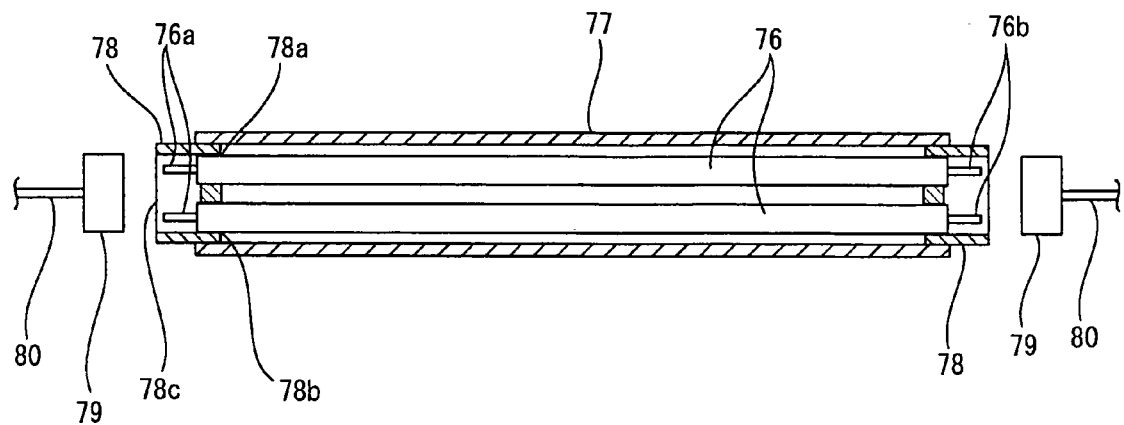
FIG. 20 is a view showing the connection between a light source and a connector of the tenth embodiment.
Figure 21:
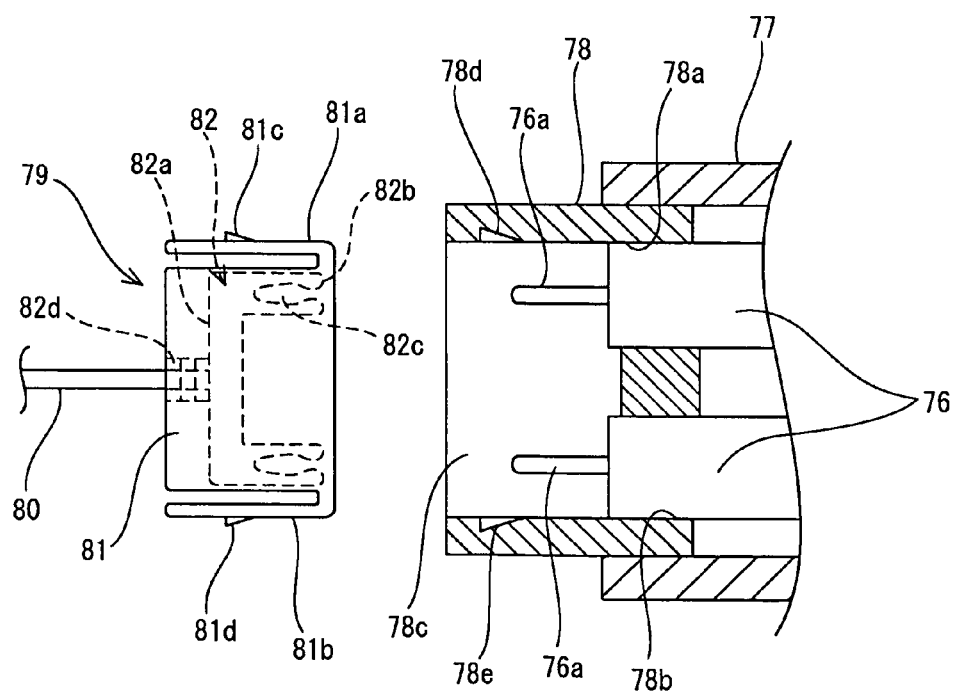
FIG. 21 is an enlarged view showing the main part of the connection between the light source and the connector of the tenth embodiment.

FIGS. 19 to 21 show a tenth embodiment.

In a liquid crystal display 70 of this embodiment, a lighting device 83 is an edge light (side light) type backlight.

The peripheral edges of the liquid crystal panel 22 is held by being interposed between a frame-shaped front chassis 72 and a bezel 71, and the lighting device 83 is positioned below the liquid crystal panel 22 via the optical sheet group 27. The lighting device 83 is so configured that two linear light sources 76 are positioned on a side end face of a light guiding plate 75, the linear light sources 76 are surrounded by a reflector 77 of substantially U-shaped cross-section, and a reflecting sheet 74 is positioned on the rear face side of the light guiding plate 75 so as to close it with a back chassis 73.

As shown in FIGS. 20 and 21, the both ends of the linear light sources 76 are positioned and held by light source-holding chassis 78, and are slidingly fitted in the reflector 77. The light source-holding chassis 78 has through holes 78a and 78b perforated for positioning the linear light sources 76, and an insertion portion 78c opened to communicate with the through holes 78a and 78b. In the inner face of the insertion portion 78c, to-be-locked portions 78d and 78e are formed as concave portions.

A connector 79 locks and fixes a press-contact terminal 82, press-fixed to a power supply line 80, in a housing 81.

The press-contact terminal 82 has, on a part of the back end side of a substrate 82a, a barrel 82d to which the core line of the poser supply line 80 is press-fixed by caulking, and has two press-contact tubs 82b, each of which has a slot 82c, protrudingly formed from the tip side of the substrate 82a.

The housing 81 is made of a polymeric material such as resin, and has flexible pieces 81a and 81b (unlocking means) protrudingly formed in a folded shape from the tips of the side faces. On the outer faces of the flexible pieces 81a and 81b, locking portions 81c and 81d are protrudingly formed.

When the connector 79 is fitted in the insertion portion 78c of the light source-holding chassis 78, locking portions 81c and 81d are locked and fixed to the to-be-locked portions 78d and 78e, and the electrode terminal 76a of the linear light source 76 is held by being interposed in the slot 82c of the press-contact terminal 82. In order to detach the connector 79, pinching the flexible pieces 81a and 81b so as to be flexed in an approaching direction, whereby the locking portions 81c and 81d and the to-be-locked portions 78d and 78e can be easily unlocked.

Then, by sliding the linear light source 76 to sideward from the state where the connector 79 is detached, it is possible to perform a replacement operation by easily taking out the linear light source 76 with the light source-holding chassis 78.

Figure 22:
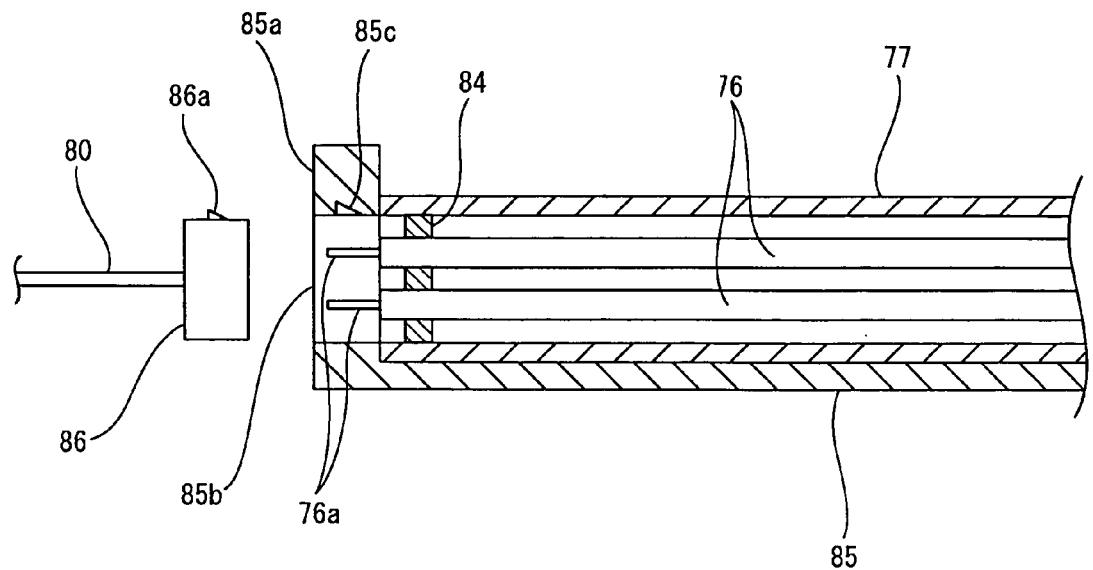
FIG. 22 is a view showing an eleventh embodiment.

FIG. 22 shows an eleventh embodiment.

In this embodiment, a side wall 85a of the back chassis 85 is used as a light source-holding chassis, and an insertion portion 85b is formed therein. In the inner face of the insertion portion 85b, a to-be-locked portion 85c is provided.

Each linear light source 76 is slidingly fitted in the reflector 77 while being positioned and held by a holder 84.

When a connector 86 is fitted in the insertion portion 85b, a locking portion 86a thereof is locked and fixed to the to-be-locked portion 85c, and the connector 86 is electrically connected to the electrode terminal 76a of the linear light source 76. The replacement operation of the linear light source 76 is so performed that the connector 86 is drawn from the insertion portion 85b in the reverse procedure, and then the linear light source 76 with the holder 84 is taken out through the insertion portion 85b. Note that the holder 84 for holding the linear light sources 76 may be abolished, and instead, a light source holding hole may be formed in the side wall 85 itself of the chassis. Other configurations are similar to those of the tenth embodiment, so their explanations are omitted.

Figure 23:
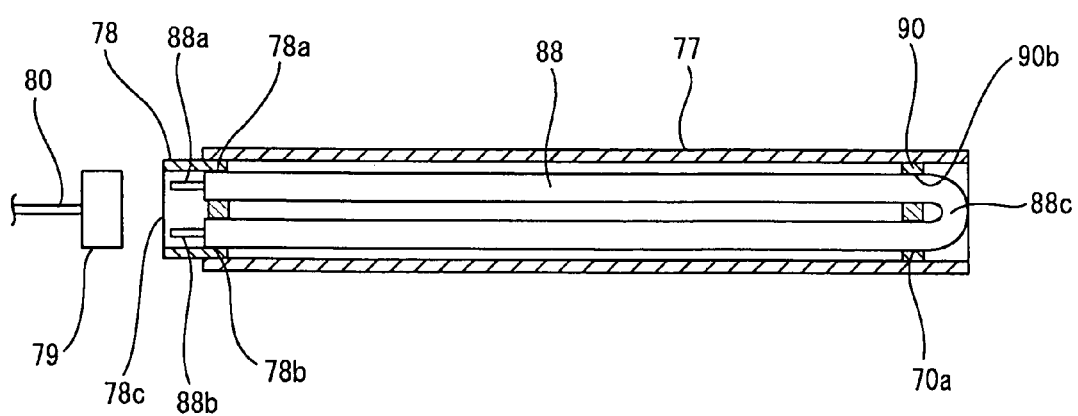
FIG. 23 is a view showing a twelfth embodiment.

FIG. 23 shows a twelfth embodiment.

In this embodiment, a linear light source 88 is folded in a substantially U-shape to be curved, and electrode terminals 88a and 88b at both ends are protruded in the same direction, as similar to that of the fourth embodiment.

The linear light source 88 is positioned and held at the bent portion 88c by a holder 90 having holding holes 90a and 90b. Other configurations are similar to those of the tenth embodiment, so their explanations are omitted.

Figure 24:
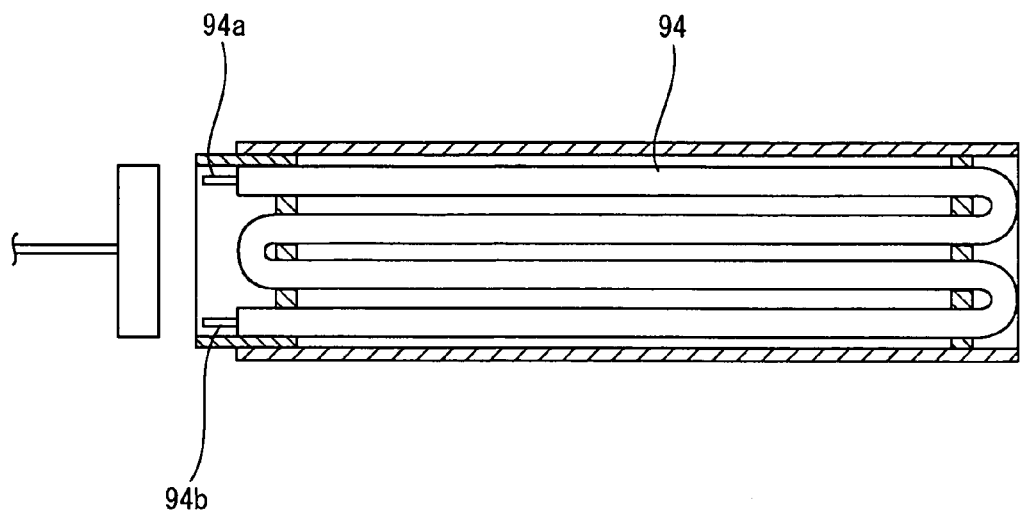
FIG. 24 is a view showing a thirteenth embodiment.

FIG. 24 shows a thirteenth embodiment.

In this embodiment, a linear light source 94 is curved in a substantially W-shape, and electrode terminals 94a and 94b at both ends are protruded in the same direction, as similar to that of the fifth embodiment. Other configurations are similar to those of the tenth embodiment, so their explanations are omitted.

Figure 25:
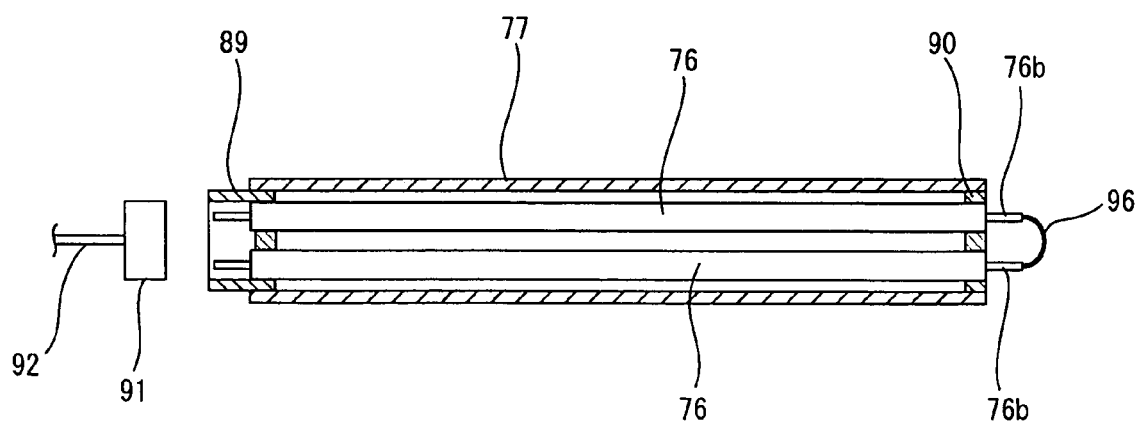
FIG. 25 is a view showing a fourteenth embodiment.

FIG. 25 shows a fourteenth embodiment.

In this embodiment, adjacent linear light sources 76, in forms of straight lines, are formed to be an artificial U-shaped tube by connecting electrode terminals 76b of the other ends to each other with an electric wire 96. Note that a member for connecting the electrode terminals 76b is not limited to the electric wire 96, but may be a joint bus bar, a substrate or the like. Other configurations are similar to those of the tenth embodiment, so their explanations are omitted.

Figure 26A:
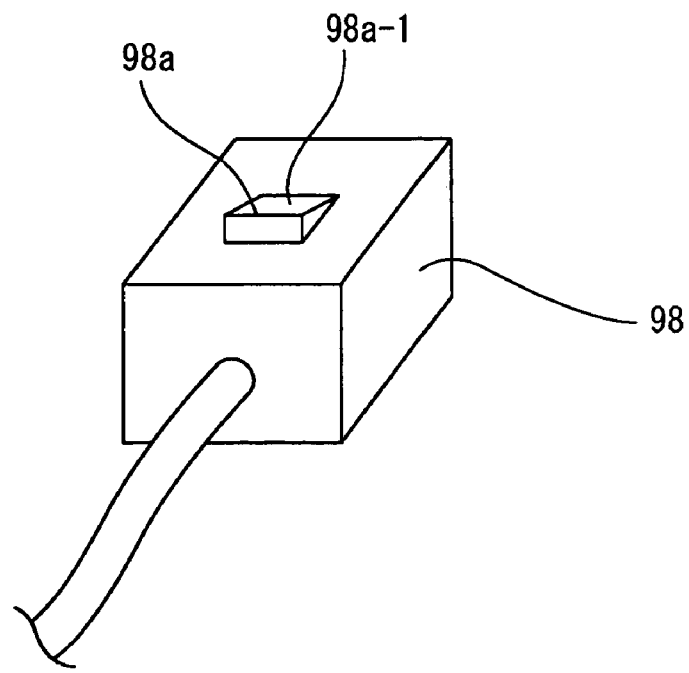
FIG. 26A is a perspective view showing a connector of a fifteenth embodiment.
Figure 26B:
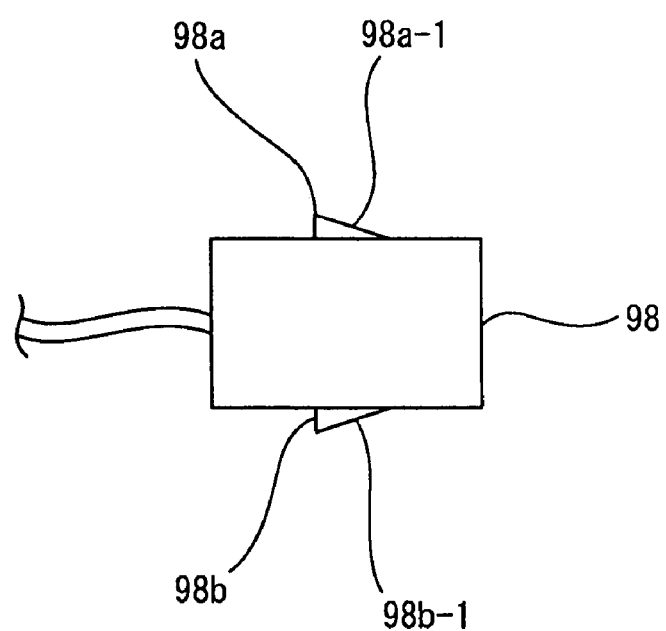
FIG. 26B is a side view showing the connector.

FIGS. 26A and 26B show a fifteenth embodiment.

A connector 98 of this embodiment can be applied to all of the aforementioned embodiments. On the upper or lower outer face of the housing, a locking portion 98a of triangular cross-section having an oblique face 98a-1 is protrudingly formed. The locking portion 98a may be formed on the right or left face of the housing, and be provided in any number not less than one.

Figure 27:
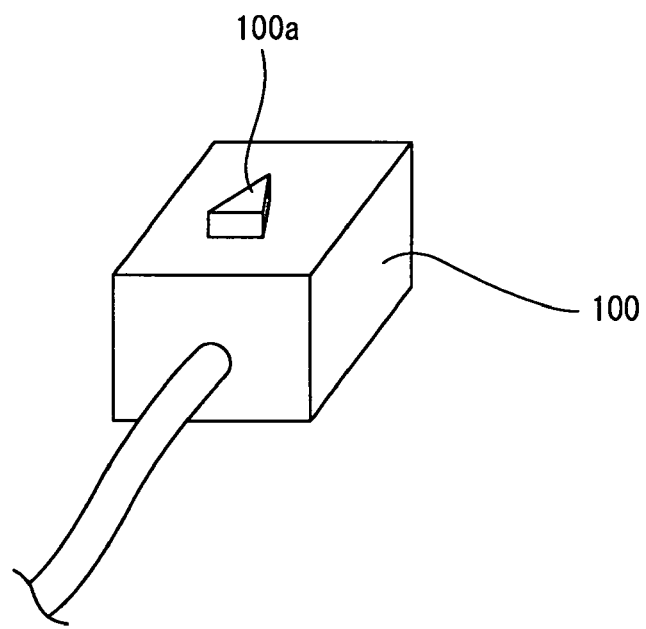
FIG. 27 is a perspective view showing a connector of a sixteenth embodiment.

FIG. 27 shows a sixteenth embodiment.

A connector 100 of this embodiment can be applied to all of the aforementioned embodiments. On an outer face of the housing, a triangular locking portion 100a is protrudingly formed.

Figure 28:
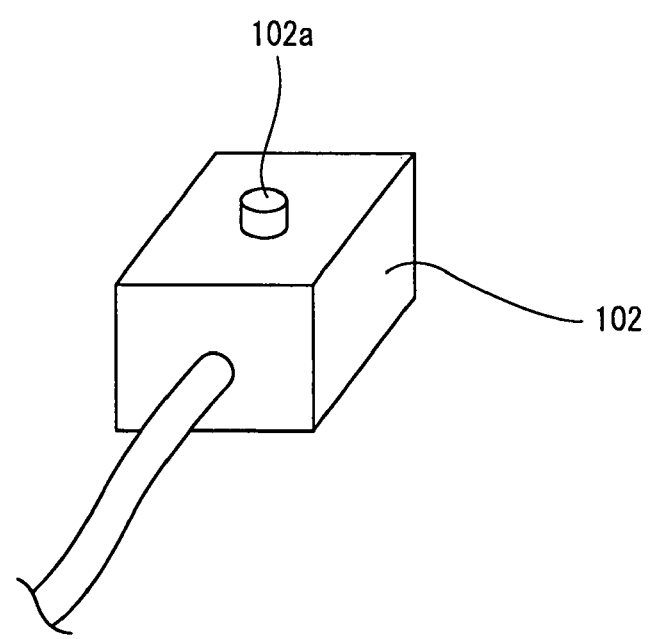
FIG. 28 is a perspective view showing a connector of a seventeenth embodiment.

FIG. 28 shows a seventeenth embodiment.

A connector 102 of this embodiment can be applied to all of the aforementioned embodiments. On an outer face of the housing, a cylindrical locking portion 102a is protrudingly formed.

Figure 29:
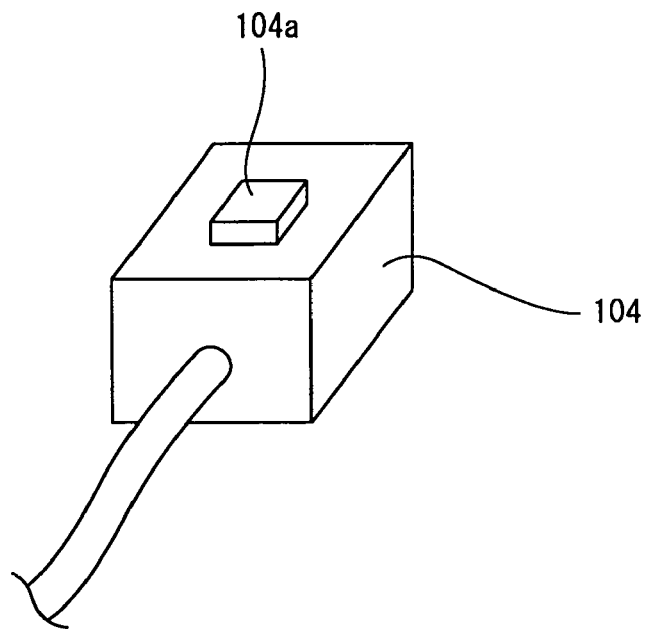
FIG. 29 is a perspective view showing a connector of an eighteenth embodiment.

FIG. 29 shows an eighteenth embodiment.

A connector 104 of this embodiment can be applied to all of the aforementioned embodiments. On an outer face of the housing, a square-pole shaped locking portion 104a is protrudingly formed.

Figure 30:
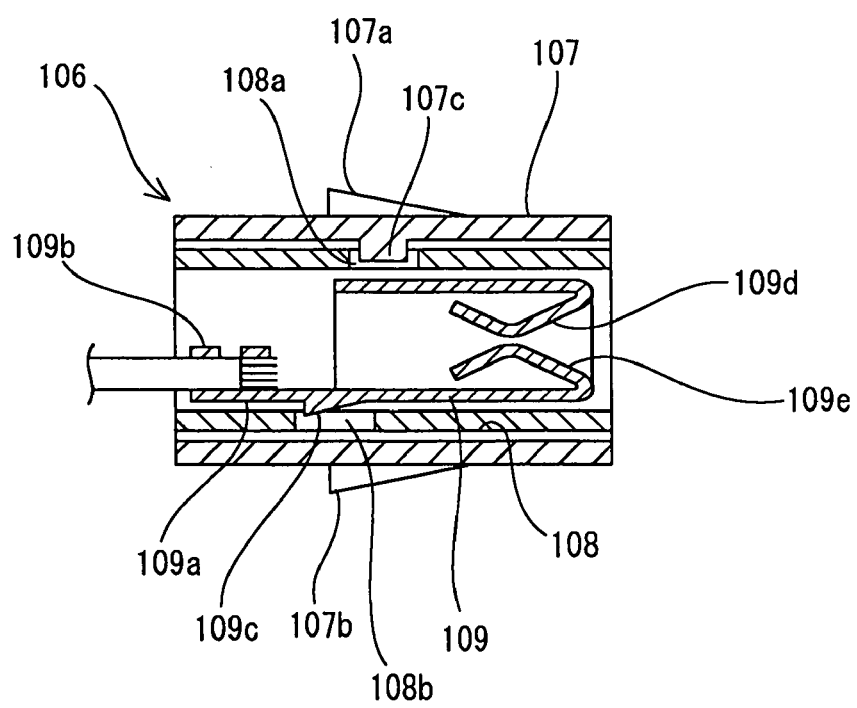
FIG. 30 is a sectional view showing a connector of a nineteenth embodiment.

FIG. 30 shows a nineteenth embodiment.

A connector 106 of this embodiment can be applied to all of the aforementioned embodiments. A rigid interior member 108 is inwardly fitted inside an elastic housing 107, and a press-contact terminal 109 connected to an end of a power supply line is locked to the interior member 108.

The housing 107 is made of a polymeric material such as resin or rubber, and has a locking portion 107a protruded on an outer face and a locking projected portion 107c on an inner face.

The interior member 108 is made of metal, and has a locked hole 108a for locking the locking projected portion 107c and a locked hole 108b for locking the press-contact terminal 109.

The press-contact terminal 109 is made of metal. The press-contact terminal 109 has, on a part of the back end side of the substrate 109, a barrel 109b to which the core line of a power supply line is press-fixed by caulking, and has a pair of protruding elastic tongue pieces 109d and 109e formed by being folded from the tip side of the substrate 109a to be face-to-face in an inverted U-shape. On the lower face of the substrate 109a, a lance 109c for locking to the locked hole 108b of the interior member 108 is cut and raised.

The aforementioned configuration allows the locking portions 107a and 107b for locking to the chassis to have elasticity, and allows the press-contact terminal 109 to be held and fixed securely with the interior member 108 with rigid intensity. Note that the housing 107 is not limited to be made of rubber, and may be made of another material with elasticity such as resin or silicone. Further, the interior member 108 is not limited to be made of metal, and may be made of another material with rigidity such as resin.

Figure 31:
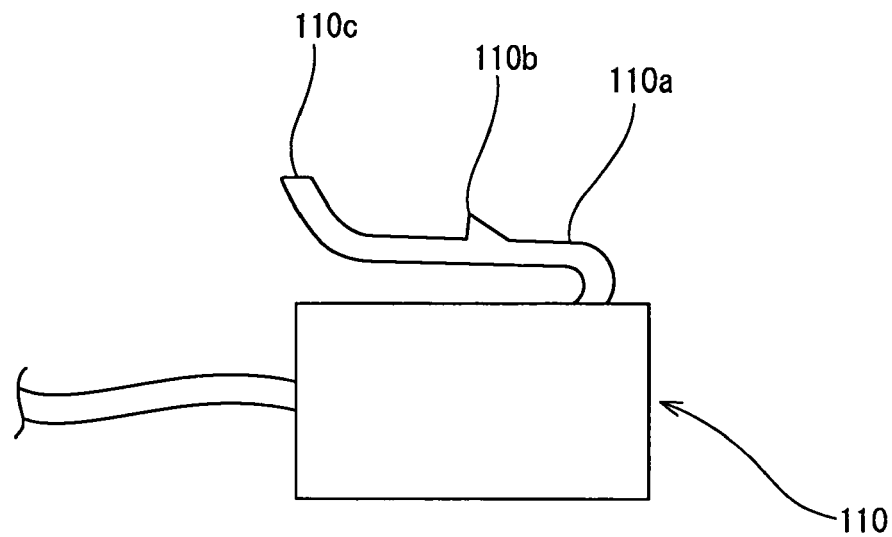
FIG. 31 is a side view showing a connector of a twentieth embodiment.

FIG. 31 shows a twentieth embodiment.

A connector 110 of this embodiment can be applied to all of the aforementioned embodiments. The connector 110 has a flexible tongue piece 110a serving as an unlocking means.

The housing of the connector 110 is made of resin, and has the flexible tongue piece 110a protruded backward from an outer face. On an outer face of the flexible tongue piece 110a, a locking portion 110b is provided. The locking portion 110b, locked to the to-be-locked portion (not shown) of the insertion portion, is made to be unlocked when the back end 110c of the flexible tongue piece 110a is pressed downward.

Figure 32:
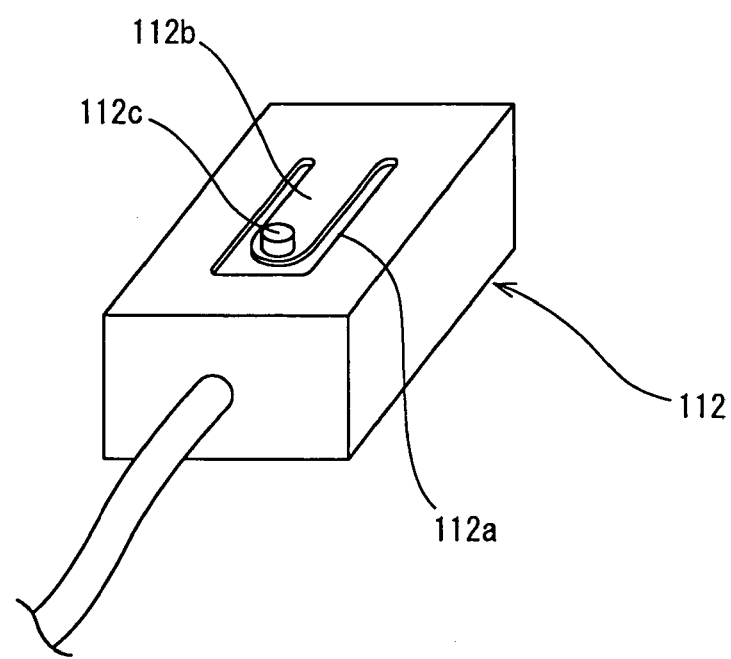
FIG. 32 is a perspective view showing a connector of a 21st embodiment.

FIG. 32 shows a 21st embodiment.

A connector 112 of this embodiment can be applied to all of the aforementioned embodiments. On an outer face of the housing, a substantially U-shaped slit 112a is cut out so as to form a flexible portion 112b, and a locking portion 112c is protrudingly formed at the back end of the flexible portion 112b.

Figure 33:
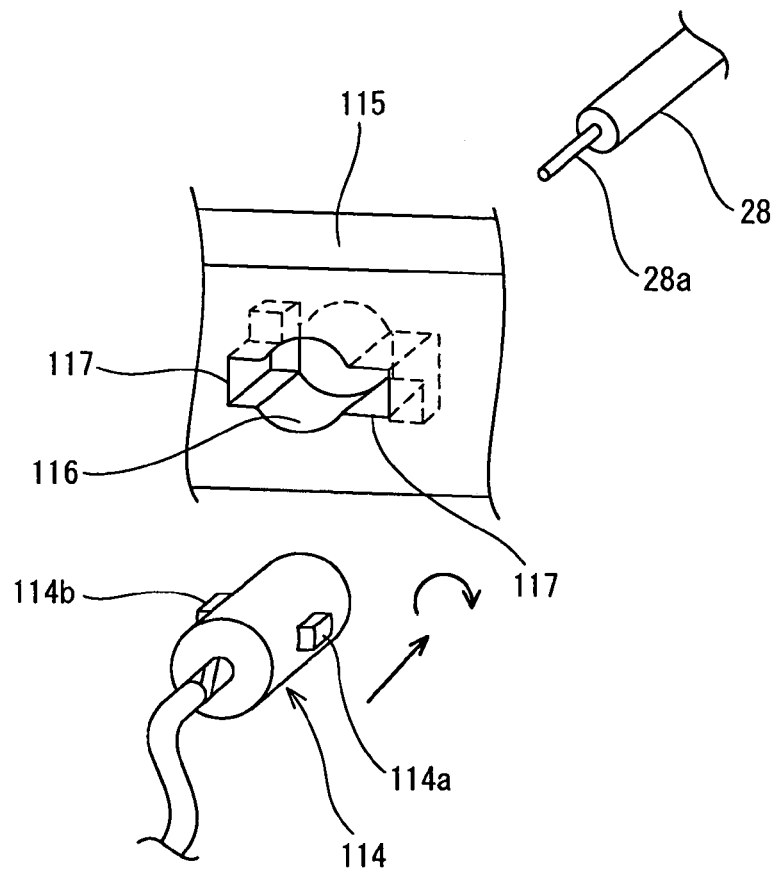
FIG. 33 is a perspective view showing the main part of a 22nd embodiment.
Figure 34:
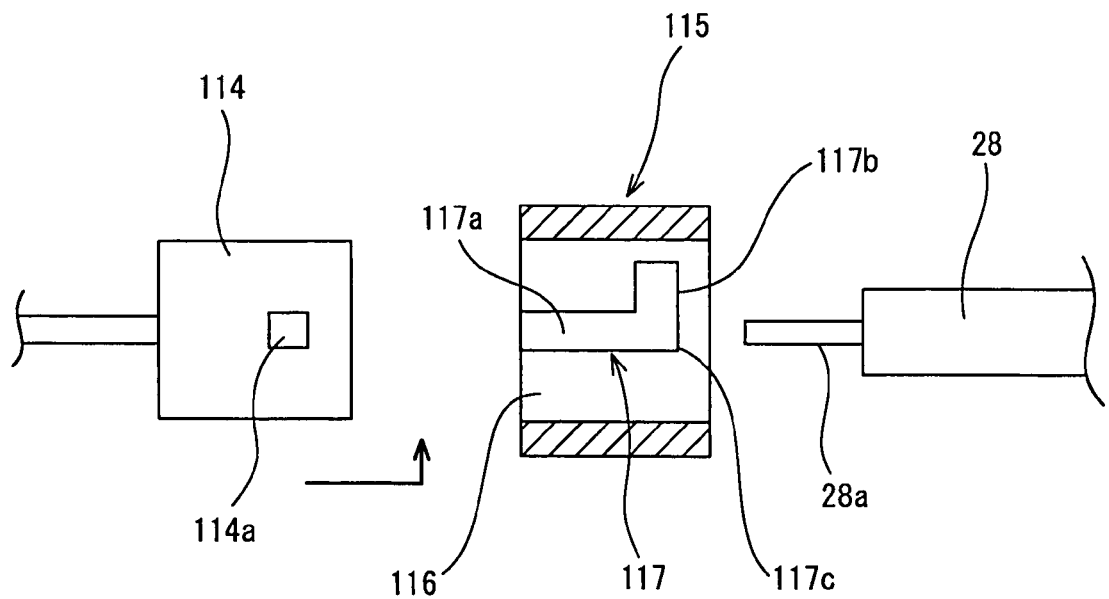
FIG. 34 is a sectional view showing the main part of the 22nd embodiment.

FIGS. 33 and 34 show a 22nd embodiment.

In this embodiment, a connector 114 of a circular cross-section has a locking projected portion 114a on an outer face thereof. In the inner face of an cylindrical insertion portion 116 of a light source-holding chassis 115, a locked groove 117 is cut out from the end face of the connector penetrating side. The locked groove 117 is in an L-shape in which a horizontal portion 117a along the axial direction is followed by a vertical portion 117b via a bent portion 117c.

The connector 114 is locked in the following manner. That is, the connector 114 is inserted in the insertion portion 116, and the locking projected portion 114a is slidingly inserted in the horizontal portion 117a of the locked groove 117. At the point that the locking projected portion 114a reached the bent portion 117c, the connector 114 is rotated in a clockwise direction about the axis, whereby the locking projected portion 114a is moved to the vertical portion 117b. When detaching the connector 114, the connector 114 can be easily detached by being rotated in a counter-clockwise direction in the reverse procedure, and then drawn.

Figure 35:
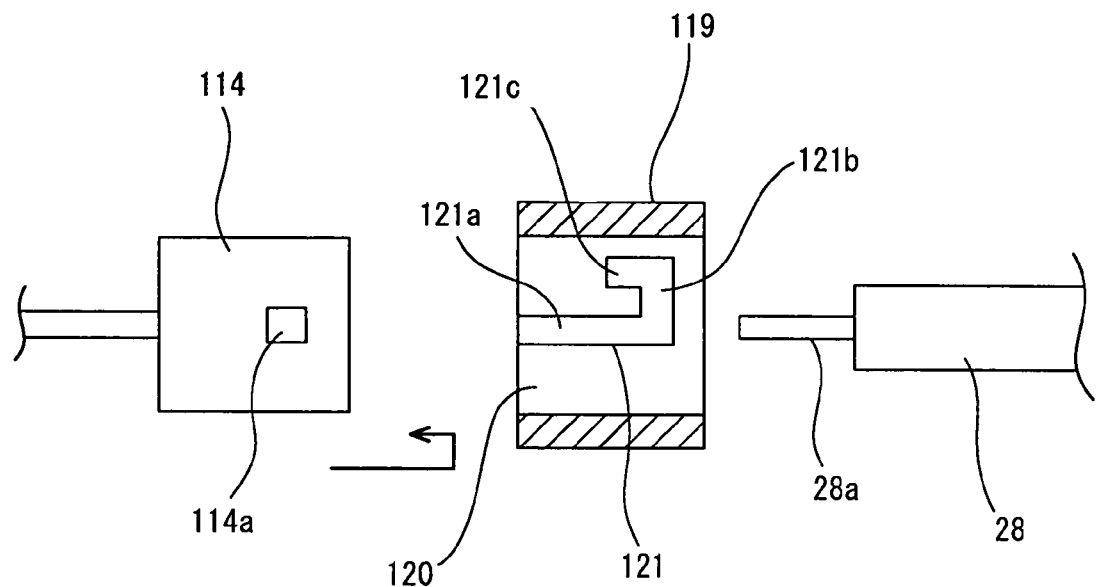
FIG. 35 is a sectional view showing the main part of a 23rd embodiment.

FIG. 35 shows a 23rd embodiment.

The difference from the 22nd embodiment is that a turned-back portion 121c is provided at the end of a locked groove 121 of an insertion portion 120 of a light source-holding chassis 119.

The locked groove 121 has a vertical portion 121b following a horizontal portion 121a along the axial direction, and also has a turned-back portion 121c, at the tip of the vertical portion 121b, facing in a direction opposite to the connector inserting direction. This prevents the connector 114 from falling off since the locking projected portion 114a reaches the turned-back portion 121c.

Figure 36:
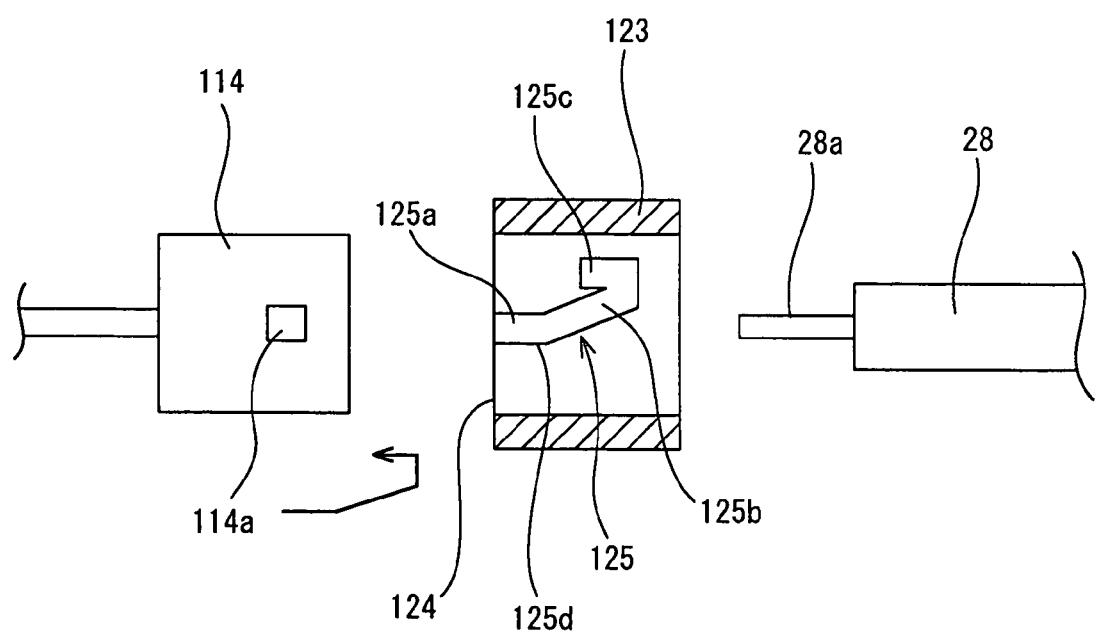
FIG. 36 is a sectional view showing the main part of a 24th embodiment.

FIG. 36 shows a 24th embodiment.

The difference from the 23rd embodiment is that a bent portion 125d of a locked groove 125 of an insertion portion 124 of a light source-holding chassis 123 is bent at an obtuse angle.

The locked groove 125 has an oblique portion 125b following a horizontal portion 125a along the axial direction via a bent portion 125d of an obtuse angle, and also has a turned-back portion 125c, at the tip of the oblique portion 125b, facing in a direction opposite to the connector inserting direction. With this configuration, the locked groove 125 is formed to be in an oblique streamline shape, whereby it is possible to cause the connector 114 to approach/separate from the electrode terminal 28a of the linear light source 28 along with a rotating operation of the connector 114 tracking the locked groove 125. This enables to adjust connecting distance between the connector 114 and the electrode terminal 28a.

Figure 37:
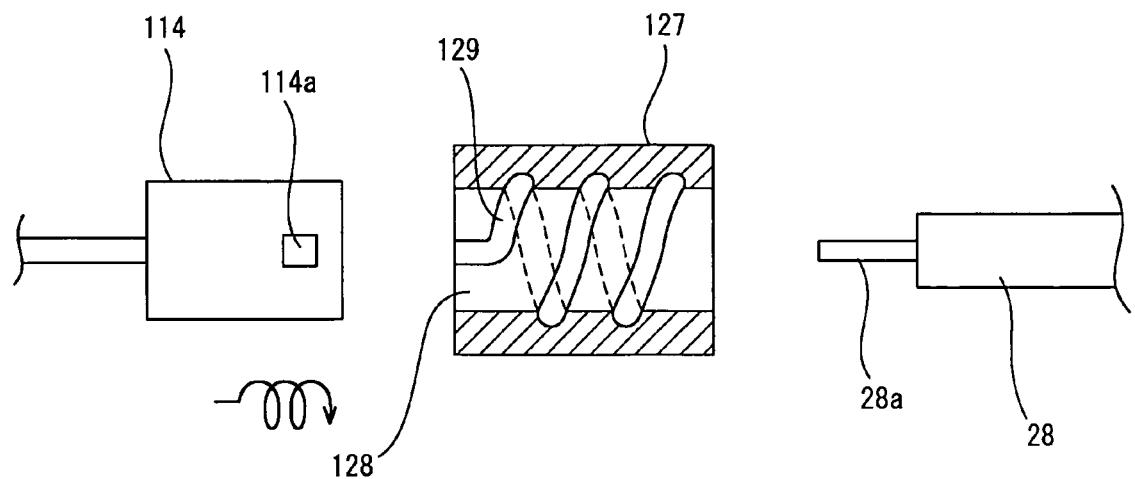
FIG. 37 is a sectional view showing the main part of a 25th embodiment.

FIG. 37 shows a 25th embodiment.

The difference from the 22nd embodiment is that a locked groove 129 of an insertion portion 128 of a light source-holding chassis 127 is formed in a spiral shape.

When the connector 114 is rotatingly inserted in the insertion portion 128, the locking projected portion 114a is slidingly inserted in and screwed to the locked groove 129. With this configuration, it is possible to cause the connector 114 to approach/separate from the electrode terminal 28a of the linear light source 28 along with a rotating operation of the connector 114. This enables to adjust connecting distance between the connector 114 and the electrode terminal 28a. Further, the connector 114 does not easily fall off unintentionally since the locked groove 129 is in a spiral shape.

Figure 38A:
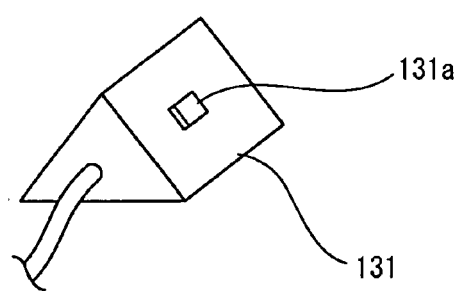
FIG. 38A is a perspective view showing a connector of a 26th embodiment.
Figure 38B:
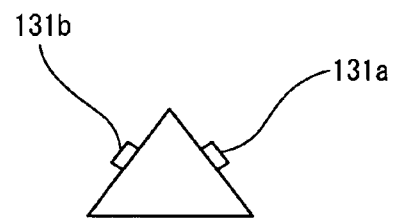
FIG. 38B is a front view showing the connector.

FIGS. 38A and 38B show a 26th embodiment.

A connector 131 of this embodiment can be applied to all of the aforementioned embodiments except the 22nd to 25th embodiments. The connector 131 of triangular cross-section has locking portions 131a and 131b protrudingly formed on outer faces thereof. A connector penetrating portion (not shown), in which the connector 131 is fitted, is also of same triangular cross-section.

Figure 39A:
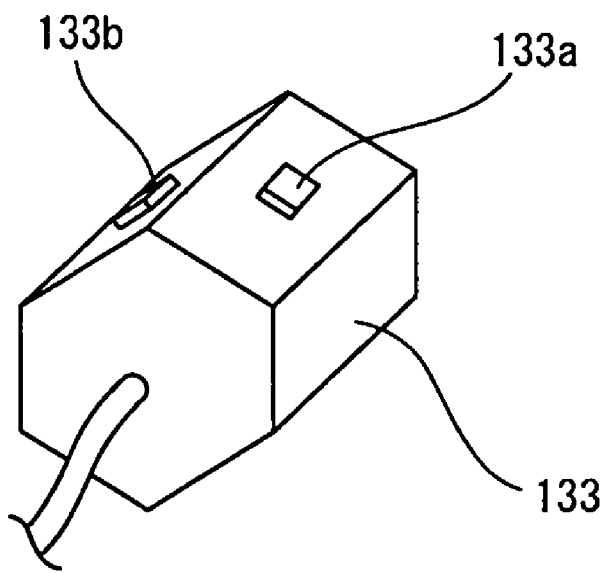
FIG. 39A is a perspective view showing a connector of a 27th embodiment.
Figure 39B:
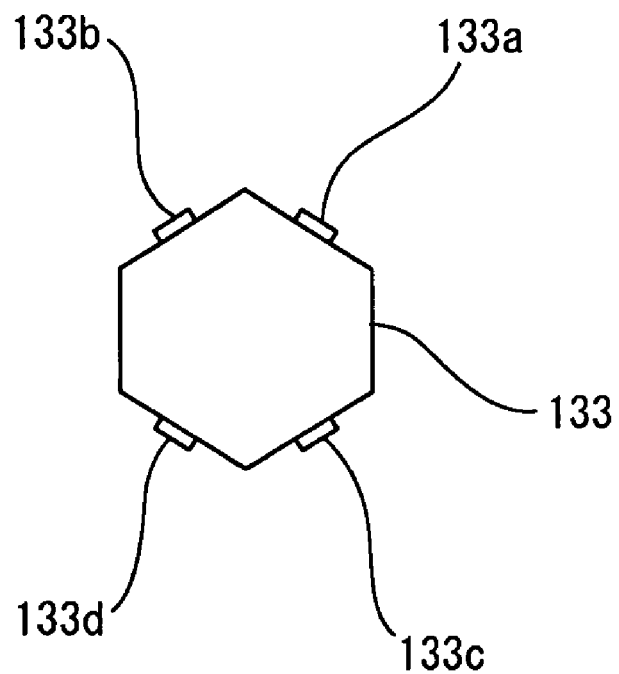
FIG. 39B is a front view showing the connector.

FIGS. 39A and 39B show a 27th embodiment.

A connector 133 of this embodiment can be applied to all of the aforementioned embodiments except the 22nd to 25th embodiments. The connector 133 of polygonal cross-section (hexagon in this embodiment) has locking portions 133a to 133d protrudingly formed on outer faces thereof. A connector penetrating portion (not shown), in which the connector 133 is fitted, is also of same polygonal cross-section.

Figure 40A:
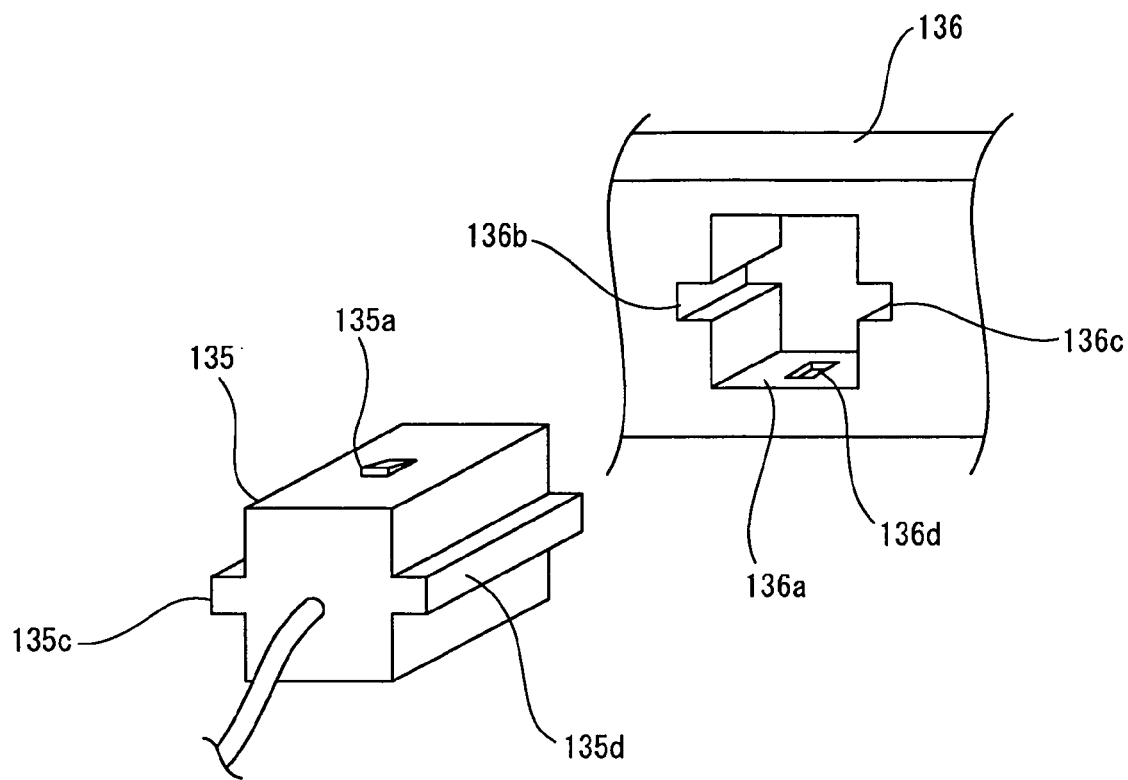
FIG. 40A is a perspective view showing a connector of a 28th embodiment.
Figure 40B:
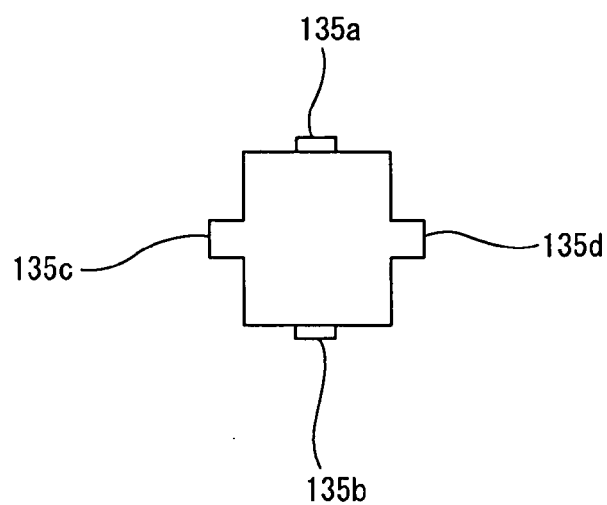
FIG. 40B is a front view showing the connector.

FIGS. 40A and 40B show a 28th embodiment.

A connector 135 of this embodiment can be applied to all of the aforementioned embodiments except the 22nd to 25th embodiments. The housing of rectangular cross-section has a pair of guiding projected portions 135c and 135d for positioning on the right and left outer faces thereof, and also has locking portions 135a and 135b on the upper and lower outer faces thereof.

An insertion portion 136a of a light source-holding chassis 136 is provided with guiding grooves 136b and 136c cut out corresponding to the guiding projected portions 135c and 135d, and also provided with a to-be-locked portion 136a.

Figure 41:
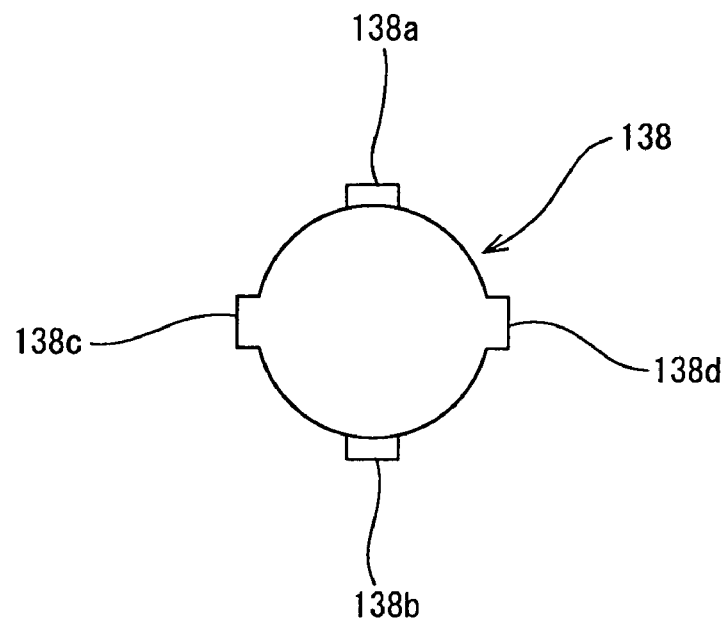
FIG. 41 is a front view showing a connector of a 29th embodiment.

FIG. 41 shows a 29th embodiment.

A connector 138 of this embodiment can be applied to all of the aforementioned embodiments except the 22nd to 25th embodiments. The difference from the 28th embodiment is that a pair of guiding projected portions 138c and 138d are formed on the outer face of the housing of the connector 138 of circular cross-section. Further, locking portions 138a and 138b are also formed protrudingly on the outer face of the housing.

Figure 42:
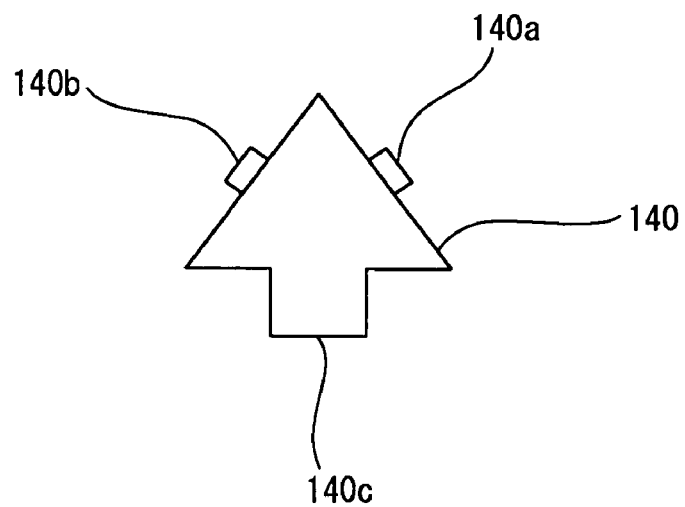
FIG. 42 is a front view showing a connector of a 30th embodiment.

FIG. 42 shows a 30th embodiment.

A connector 140 of this embodiment can be applied to all of the aforementioned embodiments except the 22nd to 25th embodiments. The difference from the 28th embodiment is that a guiding projected portion 140c is formed on an outer face of the housing of the connector 140 of triangular cross-section. Further, locking portions 140a and 140b are also formed protrudingly on outer faces of the housing.

Figure 43:
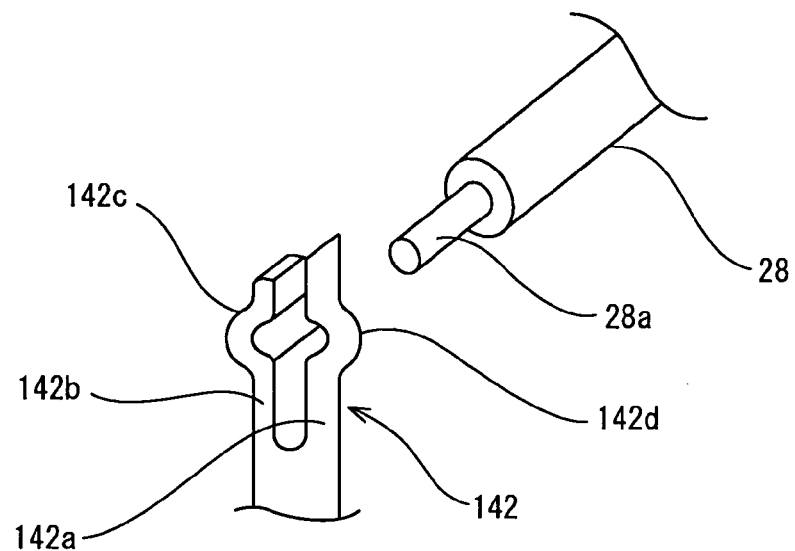
FIG. 43 is a perspective view showing the main part of a press-contact terminal of a 31st embodiment.

FIG. 43 shows a 31st embodiment.

This embodiment shows a variation of a press-contact terminal 142 accommodated in the connector housing by being press-fixed to an end of a power supply line.

The press-contact terminal 142 has a pair of opposite pieces 142a and 142b protrudingly formed in a tuning fork shape. At required positions of the opposite pieces 142a and 142b, arcuate portions 142c and 142d swelled in the separating directions are provided so as to form a virtual cylindrical portion. The electrode terminal 28a of the linear light source 28 is inserted and closely fitted in the opposite arcuate portions 142c and 142d, whereby an electrical connection is achieved.

Figure 44:
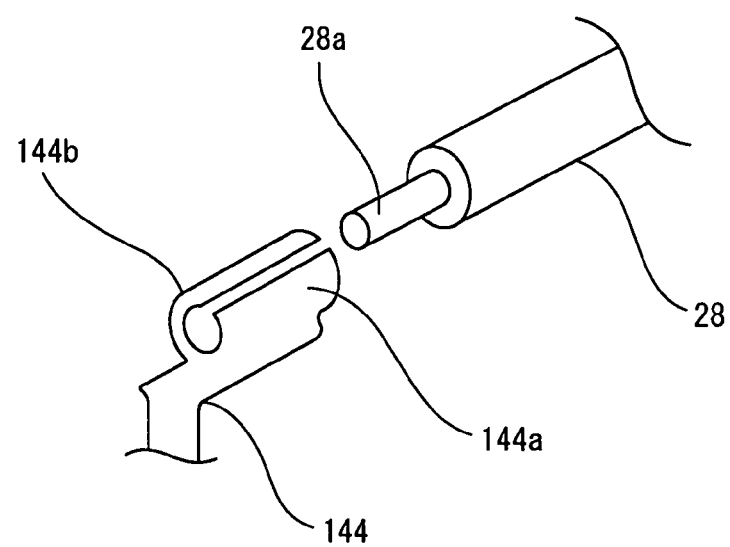
FIG. 44 is a perspective view showing the main part of a press-contact terminal of a 32nd embodiment.

FIG. 44 shows a 32nd embodiment.

A press-contact terminal 144 of this embodiment has a pair of curved arcuate portions 144a and 144b protrudingly formed opposite each other, in which the tips of the arcuate portions 144a and 144b are caused to approach each other to thereby form a cylindrical portion. The electrode terminal 28a of the linear light source 28 is inserted and closely fitted in the inner cylindrical space defined by the opposite arcuate portions 144a and 144b, whereby an electrical connection is achieved.

Figure 45:
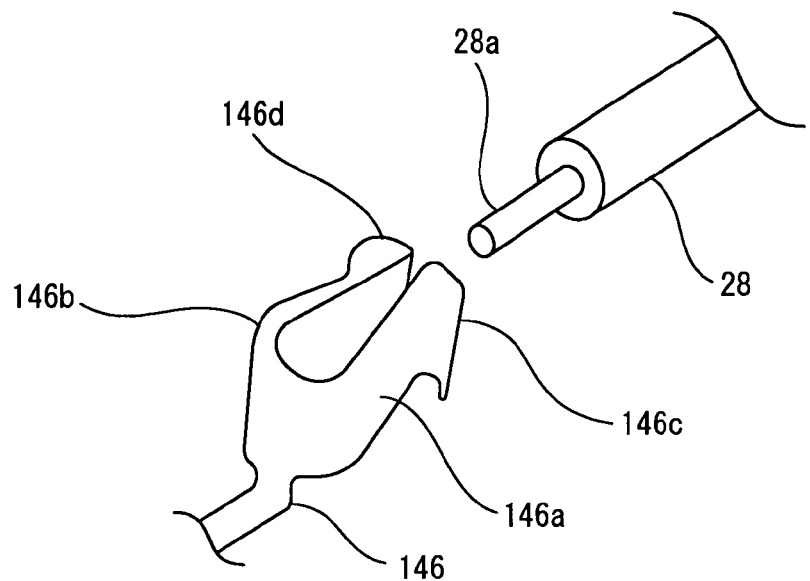
FIG. 45 is a perspective view showing the main part of a press-contact terminal of a 33rd embodiment.

FIG. 45 shows a 33rd embodiment.

A press-contact terminal 146 of this embodiment has elastic tongue pieces 146a and 146b, protrudingly formed in a substantially U-shape, which are approaching each other toward the tips, and the tips 146c and 146d are turned outward. The electrode terminal 28a of the linear light source 28 is fitted in between a pair of opposite tips 146c and 146d so as to be press-contacted. Since the tips 146c and 146d are turned outward, the electrode terminal 28a can be taken in smoothly.

Figure 46:
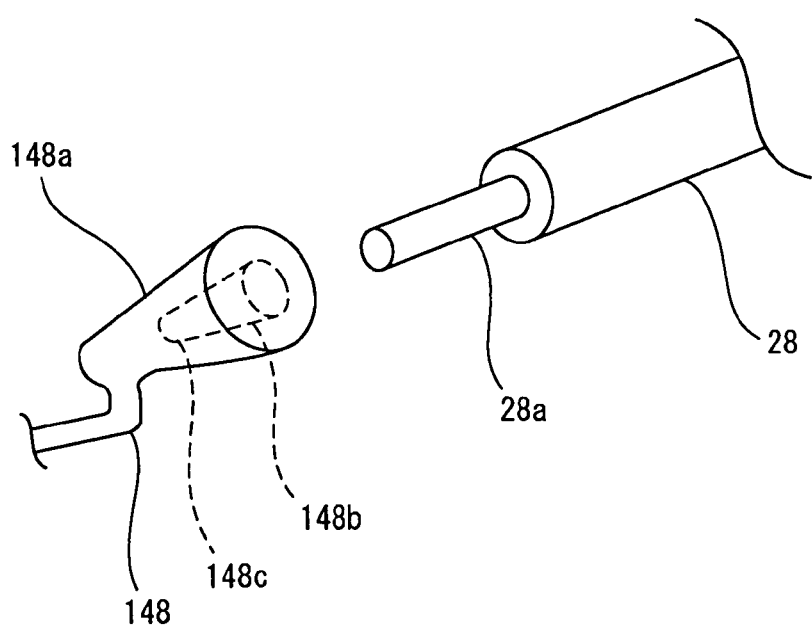
FIG. 46 is a perspective view showing the main part of a press-contact terminal of a 34th embodiment.

FIG. 46 shows a 34th embodiment.

A press-contact terminal 148 of this embodiment has a substantially cylindrical portion 148a with an axial direction same as that of the linear light source 28. The inner space 148b of the substantially cylindrical portion 148a is so formed as to become narrower from the tip opening to the end portion 148c. The electrode terminal 28a of the linear light source 28 is fitted into the inner space 148b of the press-contact terminal 148, whereby the tip side of the electrode terminal 28a is closely fitted so that an electrical connection is secured.

Figure 47A:
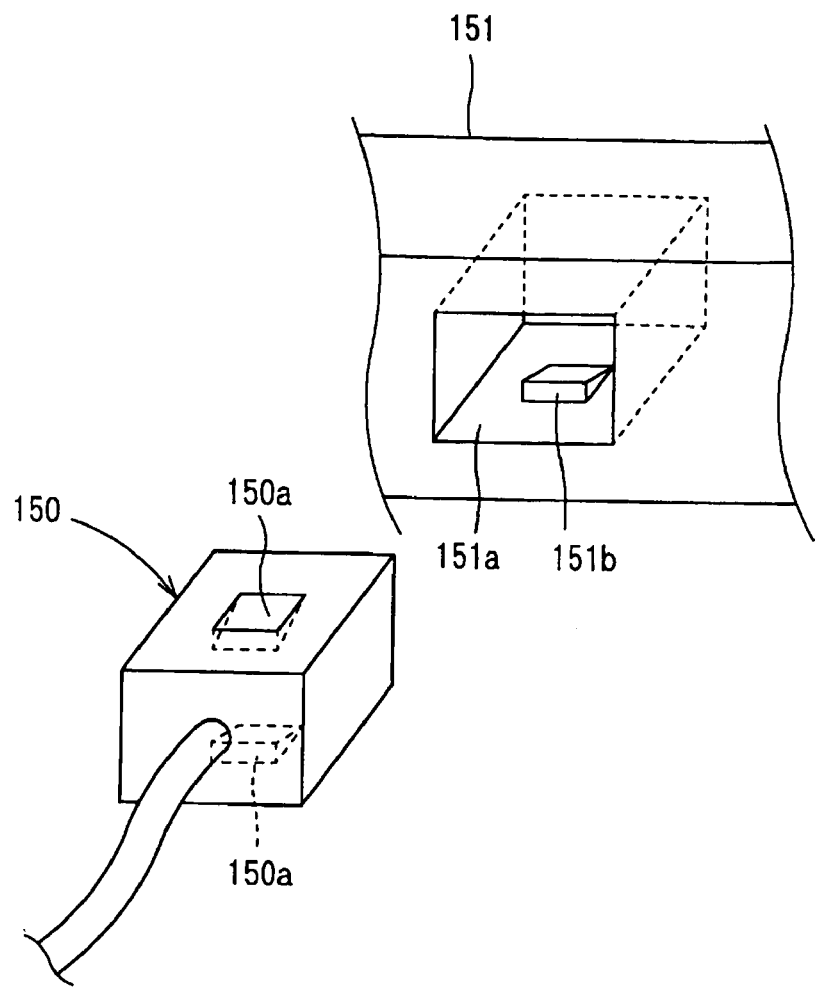
FIG. 47A is a perspective view showing the main part of a 35th embodiment.
Figure 47B:
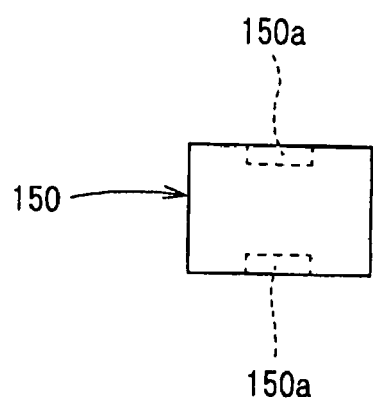
FIG. 47B is a front view showing a connector thereof.
Figure 47C:
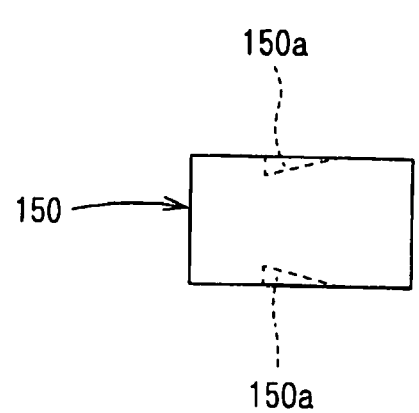
FIG. 47C is a side view of the connector.

FIGS. 47A to 47C show a 35th embodiment.

In this embodiment, a connector 150 is provided with to-be-locked portions 150a of triangular cross-section recessed in outer faces thereof, and an insertion portion 151a of a light source-holding chassis 151 is provided with protruding locking portions 151b of triangular cross-section.

Figure 48A:
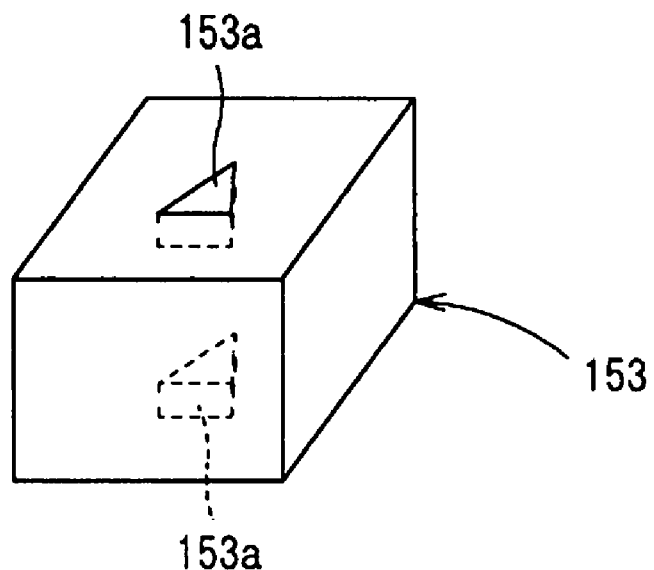
FIGS. 48A and 48B are perspective views showing a connector of a modification of the 35th embodiment.
Figure 48B:
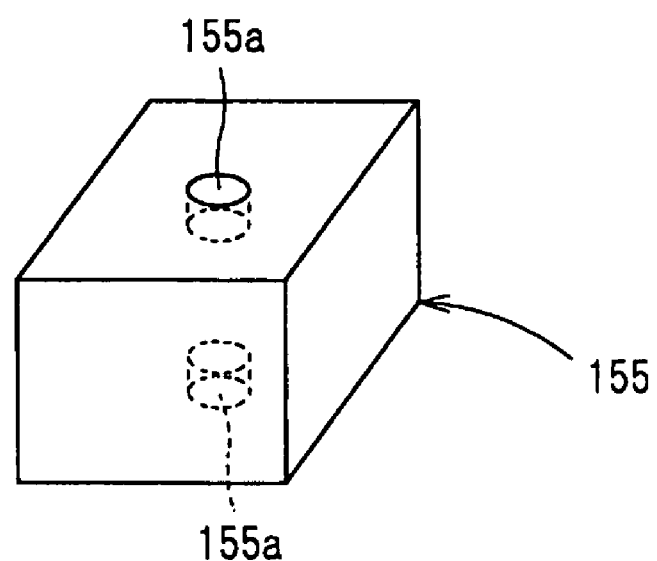

As modifications thereof, to-be-locked portions 153a of a connector 153 may be recessed in a triangular column shape as shown in FIG. 48A, or to-be-locked portions 155a of a connector 155 may be recessed in a cylindrical shape as shown in FIG. 48B, among others. In such a case, locking portions provided on the light source-holding chassis should be formed to be in a corresponding shape, of course.

Figure 49:
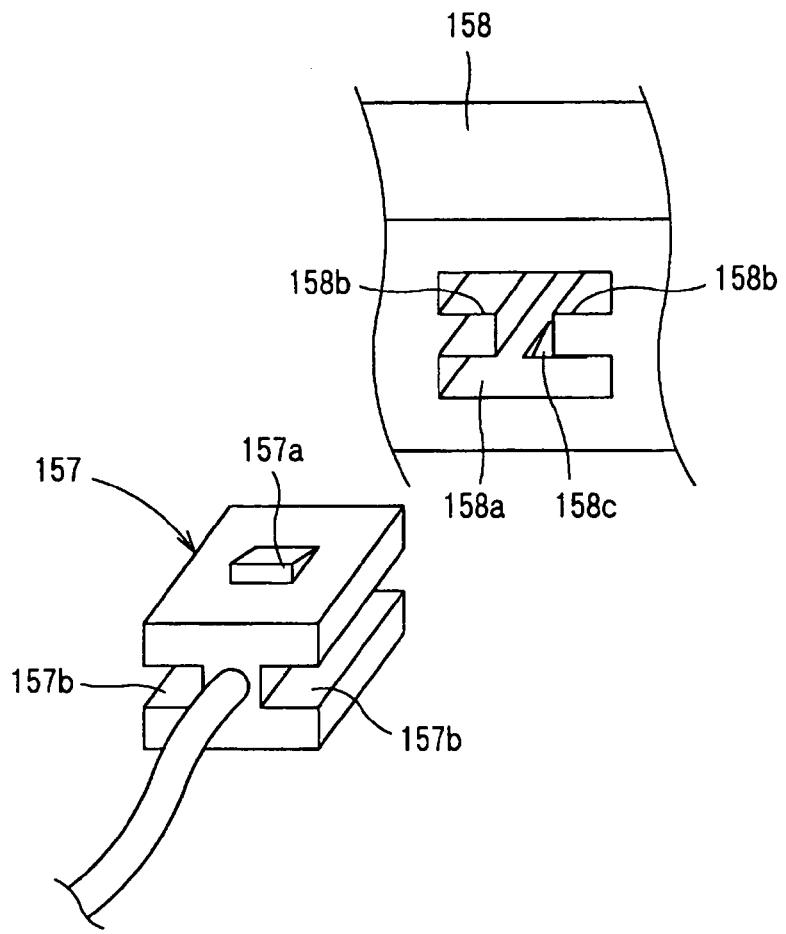
FIG. 49 is a perspective view showing the main part of a 36th embodiment.

FIG. 49 shows a 36th embodiment.

A connector 157 of this embodiment can be applied to all of the aforementioned embodiments. The housing of rectangle cross-section has a pair of guiding grooves 157b for positioning, cut out in the right and left outer faces thereof, and also has locking portions 157a on the top and bottom outer faces thereof.

An insertion portion 158a of a light source-holding chassis 158 has guiding projected portions 158b corresponding to the guiding grooves 157a, and also has to-be-locked portions 158c.

Figure 50A:
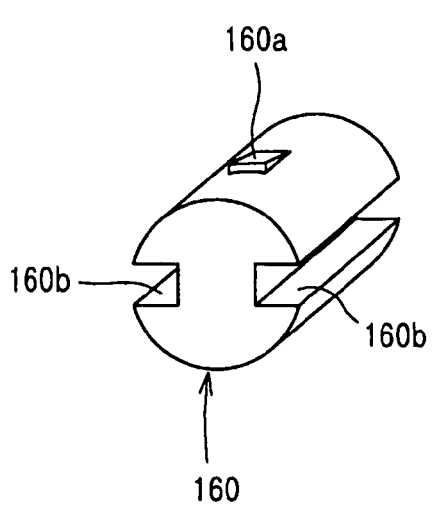
FIGS. 50A and 50B are perspective views showing a connector of a modification of the 36th embodiment.
Figure 50B:
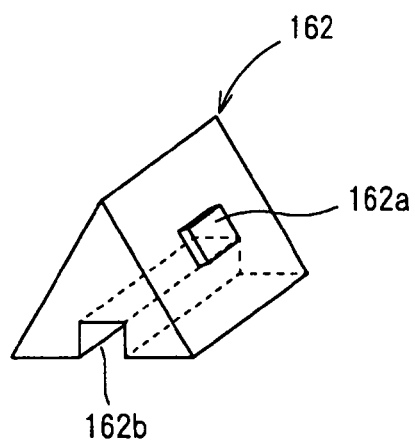

As modifications thereof, as shown in FIG. 50A, a connector 160 may be formed to be of circular cross-section, and have locking portions 160a on the top and bottom outer faces thereof and guiding grooves 160b in the right and left outer faces thereof. Alternatively, as shown in FIG. 50B, a connector 162 may be formed to be of triangular cross-section, and have a locking portion 162a on an outer face thereof and a guiding groove 162b in an outer face thereof, among others. In such a case, locking portions provided on the light source-holding chassis should be formed to be in a corresponding shape, of course.

Figure 51:
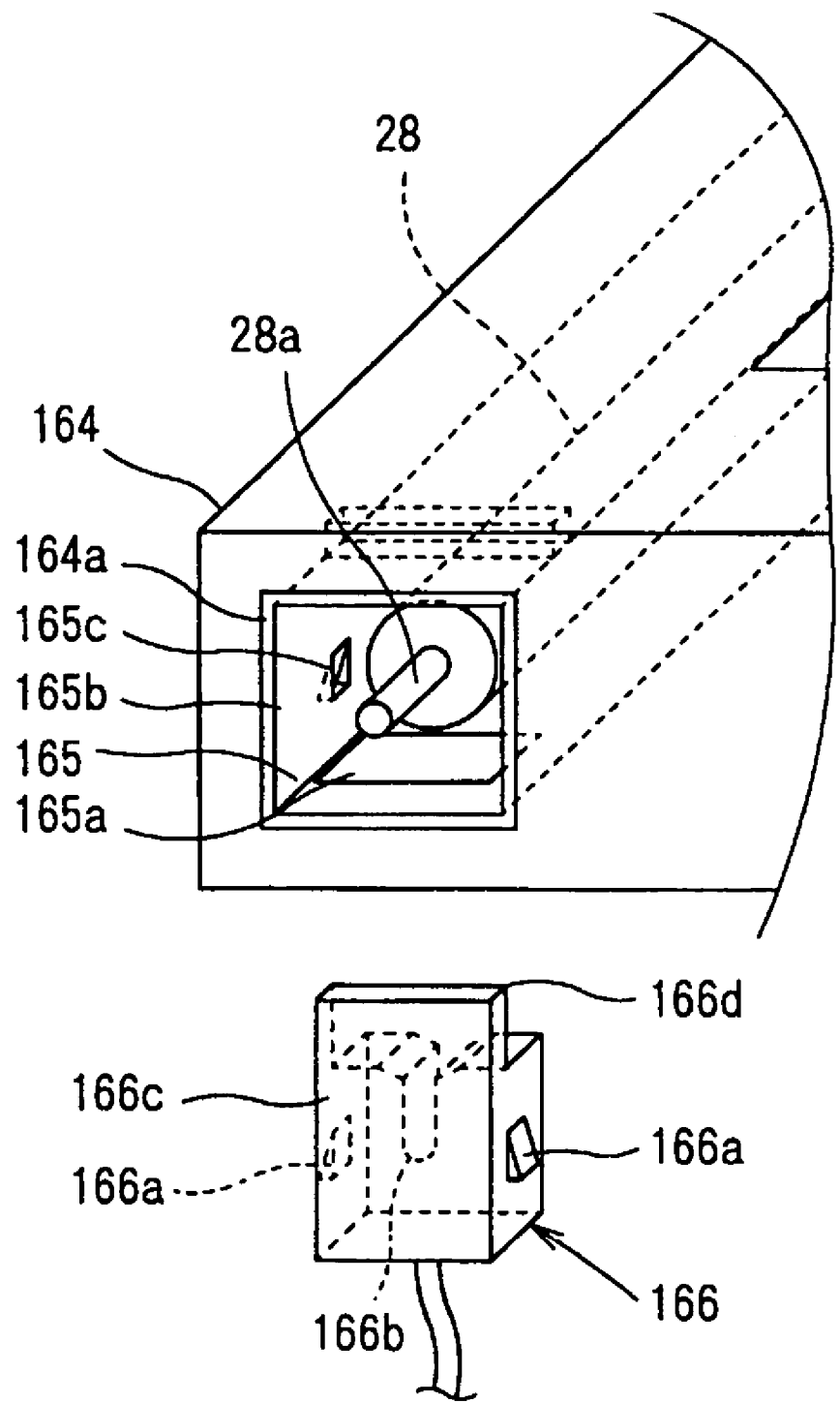
FIG. 51 is a perspective view showing the main part of a 37th embodiment.
Figure 52:
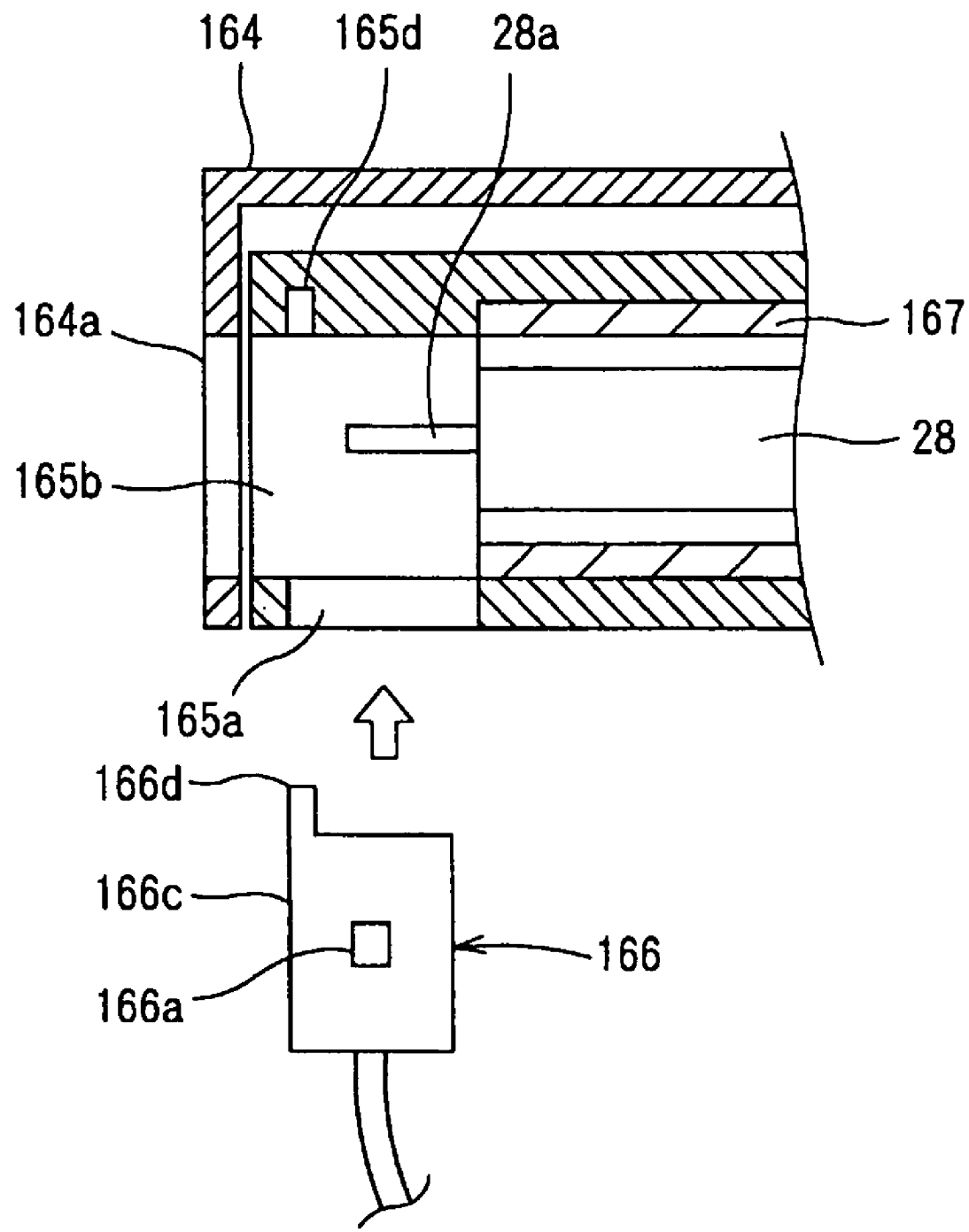
FIG. 52 is a sectional view showing the main part of the 37th embodiment.

FIGS. 51 and 52 show a 37th embodiment.

This embodiment shows a liquid crystal display in which an edge light (side light) type lighting device as shown in FIG. 19 is used as a backlight. The liquid crystal display is so configured that under the electrode terminal 28a of the linear light source 28 surrounded by a reflector 167, a chassis 165 has an insertion portion 165a perforated, and a removing port 165b opened in the axial direction of the linear light source 28. The insertion portion 165a has a to-be-locked portion 165c formed in a side face therein, and has a concave portion 165d, in which a projected portion 166d of a connector 166 described later is fitted, formed in the upper face. Further, a bezel 164 for covering the chassis 165 also has an opening 164a at a position corresponding to the removing port 165b.

The connector 166 has a slot 166b, into which the electrode terminal 28a is inserted, formed by being cut out, and a locking portion 166a protruded on a side end face. The outer side of the slot 166b is closed with a closing face 166c, and the slot 166b has a projected portion 166d formed by protruding the upper tip side of the closing face 166c.

The assembling procedure is as follows. That is, the connector 166 is inserted and inwardly fitted from the lower side through the insertion portion 165a of the chassis 165, and the electrode terminal 28a is inserted in the slot 166b of the connector 166. Thereby, the electrode terminal 28a is press-contacted with the terminal inside the connector 166, and the locking portion 166a of the connector 166 is locked and fixed to the to-be-locked portion 165c formed in the inner face of the insertion portion 165a and the projected portion 166d is fitted into the concave portion 165d, and the removing port 165b of the chassis 165 and the opening 164a of the bezel 164 are closed with the closing face 166c.

The replacement procedure of the linear light source 28 is as follows. That is, the connector 166 is drawn downward from the insertion portion 165a of the chassis 165 whereby the locking portion 166a is flexed to be unlocked, and the connector 166 and the linear light source 28 are separated. Then, the linear light source 28 is replaced with a new one through the opening 164a of the bezel 164 and the removing port 165b of the chassis 165, and the new one is assembled in the reverse procedure to the aforementioned procedure, whereby the replacement operation completes.

Figure 53A:
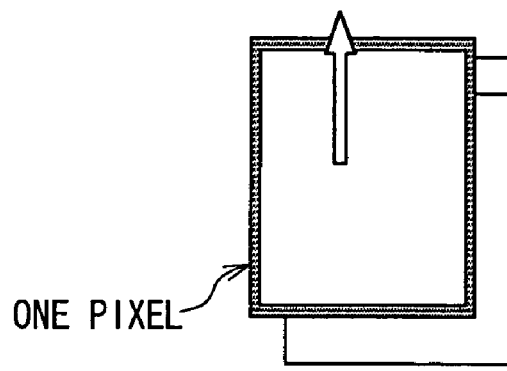
FIGS. 53A to 53D are schematic diagrams showing examples in which a light controlling method is changed in a display lighted with a lighting device of the invention.
Figure 53B:
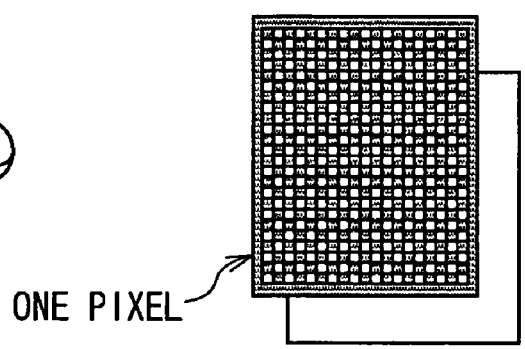
Figure 53C:
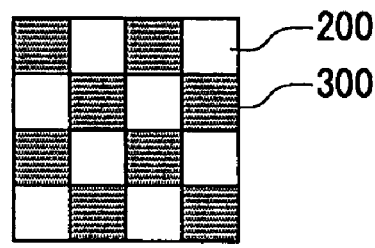
Figure 53D:
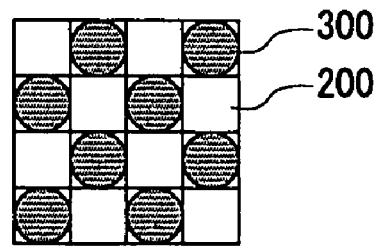
Figure 54:
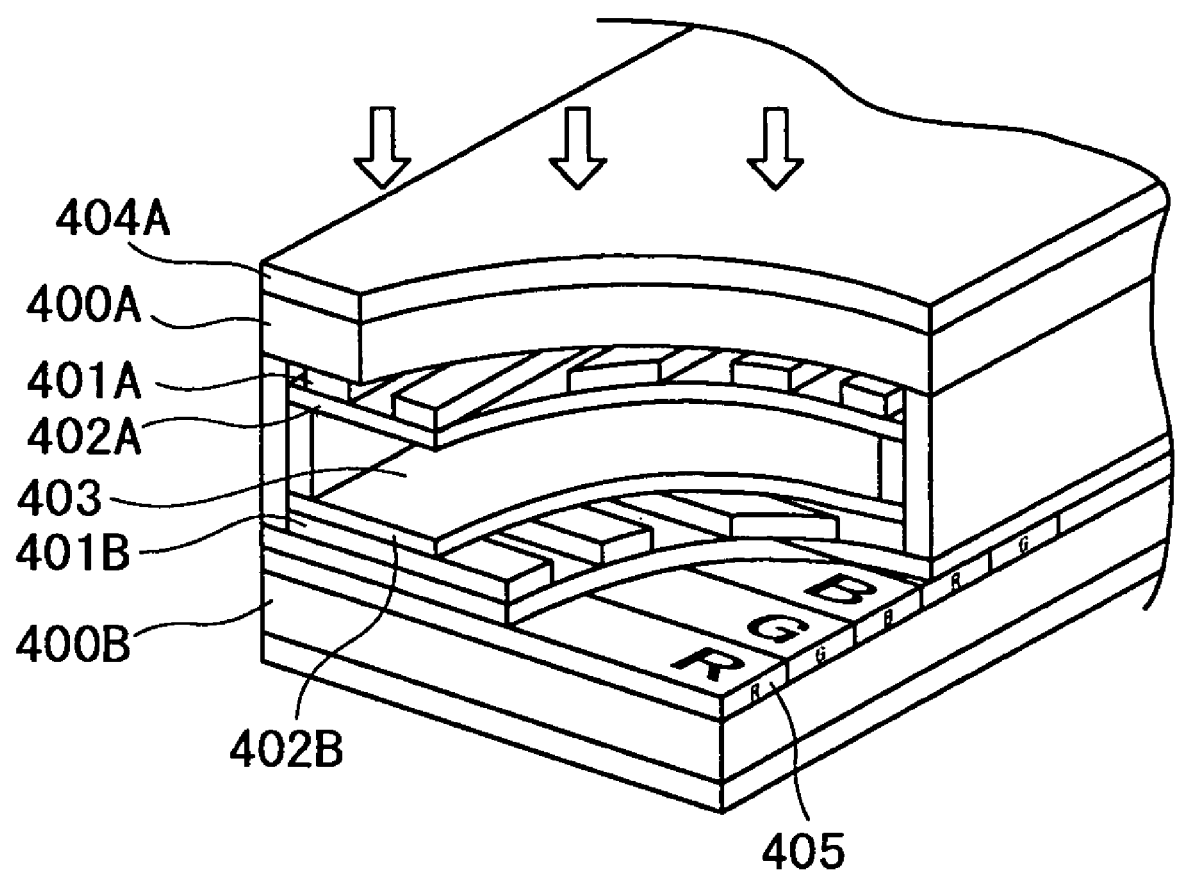
FIG. 54 is a sectional view showing a liquid crystal display.
Figure 55:
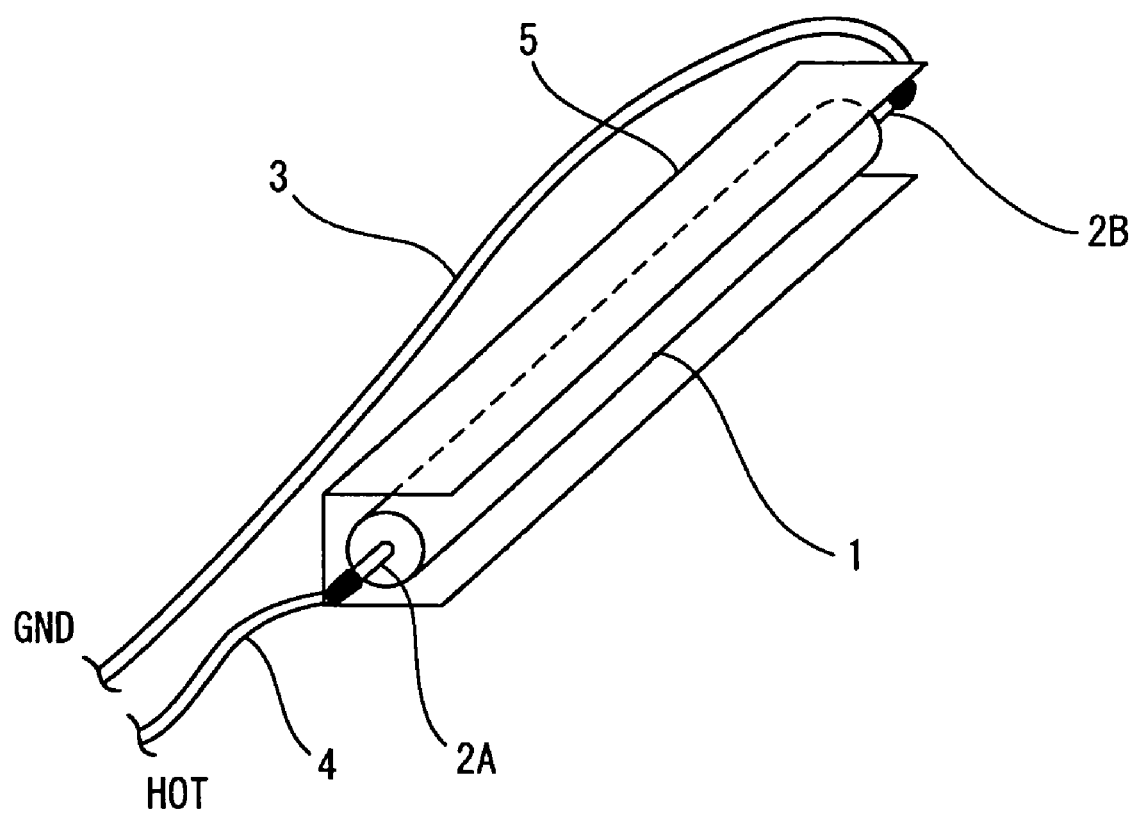
FIG. 55 is a diagram showing a light source of a conventional edge light (side light) type backlight.
Figure 56:
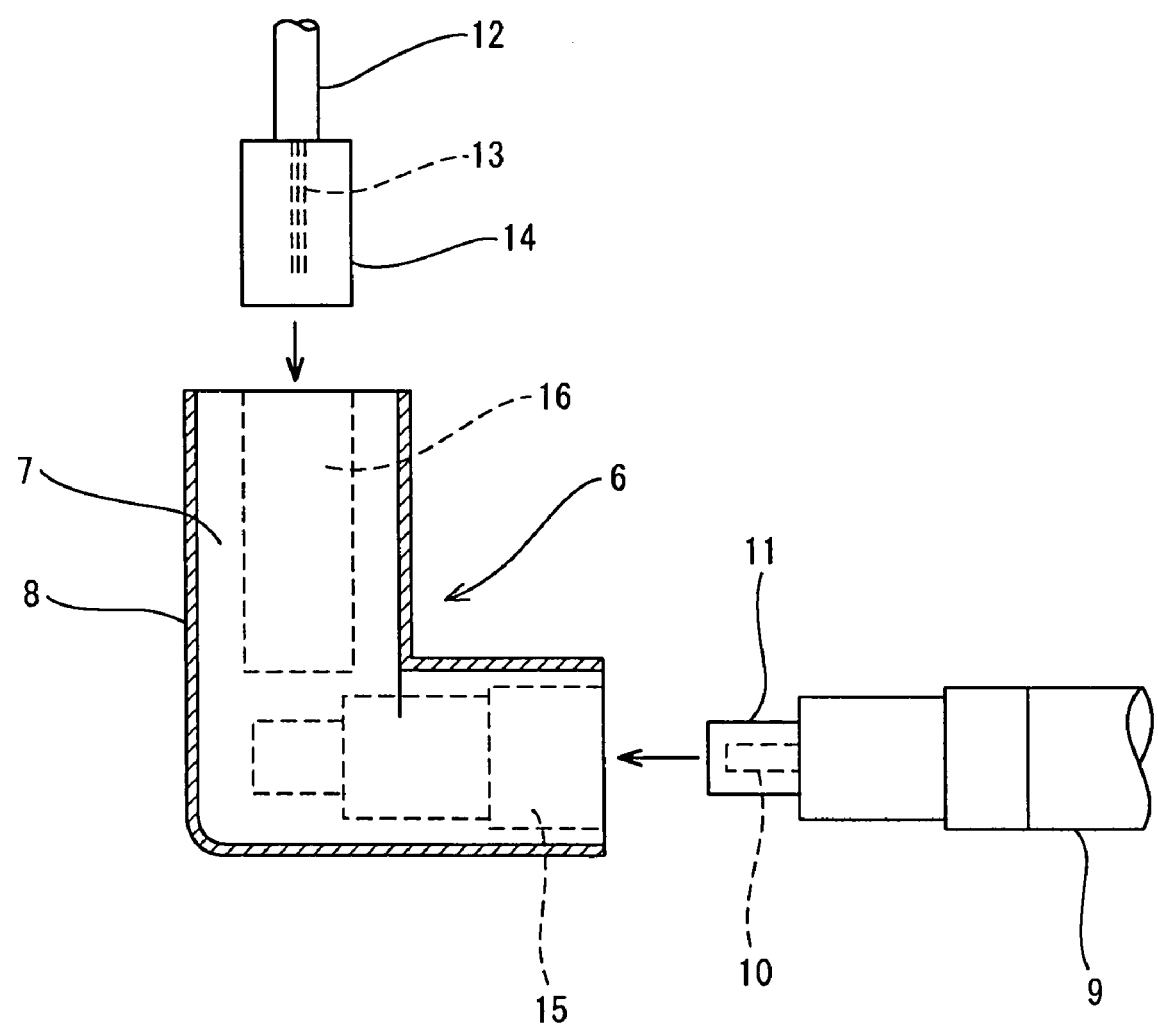
FIG. 56 is a diagram showing a conventional example.
Figure 57:
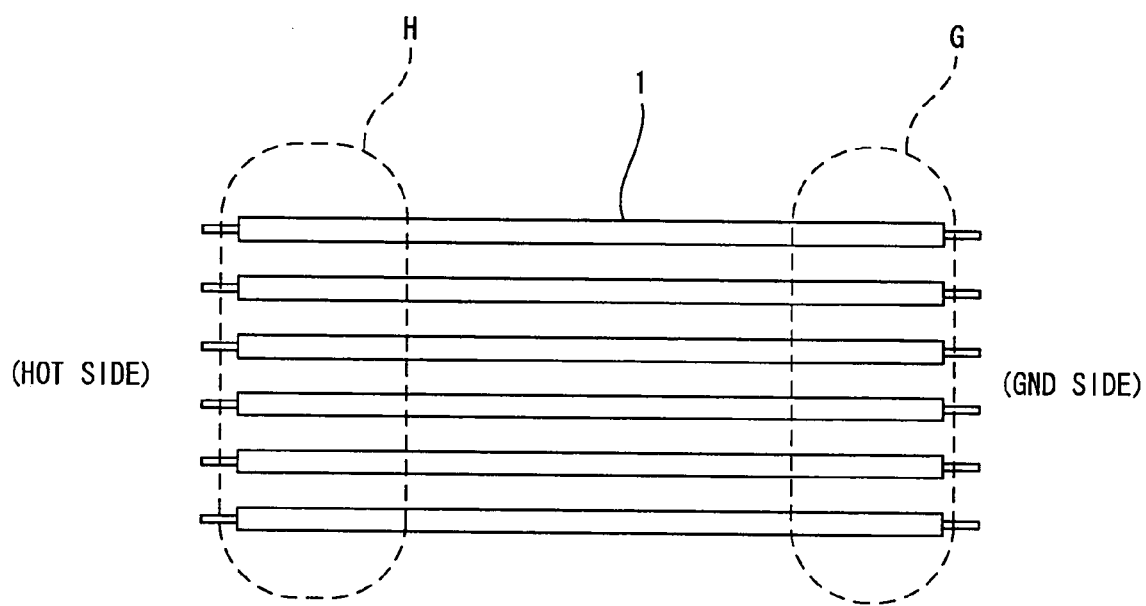
FIG. 57 is a diagram showing light sources of a conventional vertical (direct) type backlight.
Figure 58A:
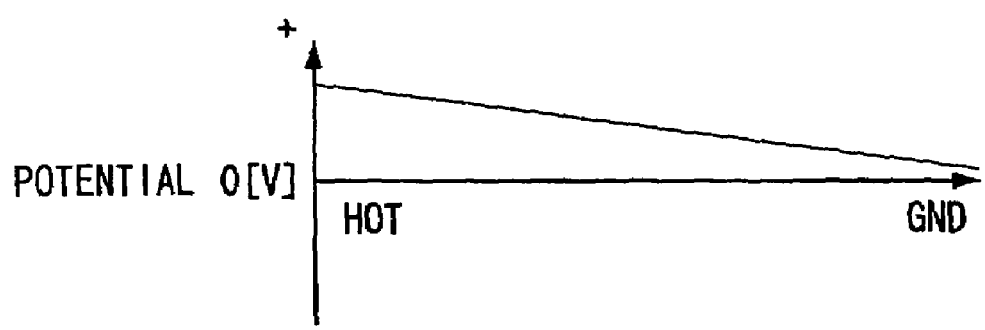
FIG. 58A is a graph showing a potential in the axis line direction of a light source.
Figure 58B:
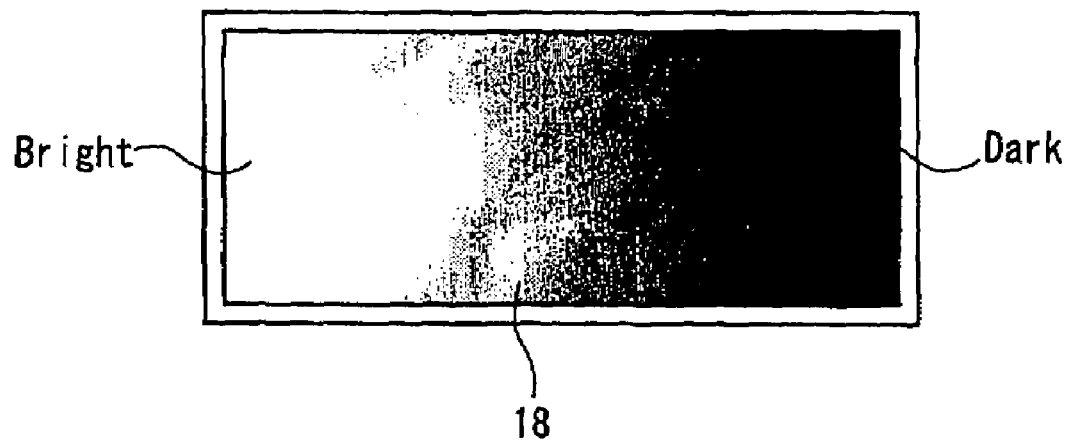
FIG. 58B is an illustration showing a display definition of a liquid crystal display.

Although a display lighted by the lighting device of each of the aforementioned embodiments is one displaying images by applying voltage to the liquid crystal so as to electrically control polarization of light as shown in FIG. 53A, the invention may be applied to displays which control light intensity by shuttering light physically and mechanically, as shown in FIGS. 53B to 53D.

FIG. 53B shows one pixel, FIG. 53C shows one pixel with diced fine square shutters, and FIG. 53D shows one pixel with diced fine circular shutters in which light transmitting portions 200 and light blocking portions 300 are formed in one pixel.

Note that the shutter is not limited to be in a square or circular shape, but may be in a polygonal shape including triangle.

What is claimed is:

1. A lighting device for a display, comprising:
a light source having a first terminal at least at one end thereof;
a power supply line for supplying power to the light source;
a connector having a second terminal communicating with the power supply line therein; and
a chassis having an insertion portion on an outside face of the chassis in communication with a through hole on an inside face of the chassis, the insertion portion arranged to receive the connector through the outside face of the chassis, wherein
the connector, connected to the end of the power supply line, and the insertion portion of the chassis are fitted to each other detachably so as to enable the first terminal of the light source and the second terminal communicating with the power supply line to be connected to each other, and the connector is pulled out from the insertion portion of the chassis through the outside face of the chassis so that the insertion portion is opened on the outside face of the chassis; and
the connector has a locking portion on an outer face of a housing thereof, and the insertion portion of the chassis has a to-be-locked portion on an inner face thereof, and the connector is fitted into the insertion portion, whereby the locking portion is locked to the to-be-locked portion and the connector is fixed to the chassis.

2. The lighting device for a display according to claim 1, wherein the chassis is provided to at least an end area of the light source.

3. The lighting device for a display according to claim 1, wherein the second terminal in the connector is a press-contact terminal, and the first terminal protruded at the end of the light source is inserted into the connector whereby the first terminal is press-contacted with and connected to the press-contact terminal.

4. The lighting device for a display according to claim 3, wherein the press-contact terminal has a pair of elastic tongue pieces opposite each other for press-contacting and holding the terminal of the light source therebetween.

5. The lighting device for a display according to claim 4, wherein each of the elastic tongue pieces is folded to be face-to-face from a tip side of the terminal in an inverted U-shape.

6. The lighting device for a display according to claim 3, wherein the press-contact terminal has a slot formed by being cut out, into which the terminal of the light source is inserted.

7. The lighting device for a display according to claim 3, wherein the press-contact terminal is provided with a substantially cylindrical portion having an axial direction same as that of the light source, and the terminal of the light source is inserted and closely fitted in the substantially cylindrical portion so as to be press-contacted and connected.

8. The lighting device for a display according to claim 7, wherein an inner space of the substantially cylindrical portion becomes narrower from a tip to an end.

9. The lighting device for a display according to claim 1, wherein the connector is detached from the insertion portion by unlocking the locking portion and the to-be-locked portion with unlocking means.

10. The lighting device for a display according to claim 1, wherein the insertion portion of the chassis is also used as a removing port for the light source.

11. The lighting device for a display according to claim 1, wherein the light source is a linear light source.

12. The lighting device for a display according to claim 11, wherein the linear light source is a discharge tube formed of a hot cathode tube, a cold cathode tube or a xenon tube, or an LED which is made into a linear light source.

13. The lighting device for a display according to claim 1, wherein the light sources are a plurality of linear light sources arranged in parallel, and one end sides of at least two or more of the light sources are electrically connected to each other.

14. The lighting device for a display according to claim 1, wherein the light source is curved to be folded so that terminals at both ends are protruded in a same direction.

15. The lighting device for a display according to claim 14, wherein the light source is folded to be in a substantially U-shape or in a substantially W-shape.

16. The lighting device for a display according to claim 1, wherein the connector has a plurality of terminals, and a plurality of terminals of the light sources are connected collectively to the connector.

17. The lighting device for a display according to claim 1, in which the connector and the power supply line are detachable, wherein a small connector is connected to an end of the power supply line and a mounting hole is formed in a rear face of the connector, and the small connector is fitted into the mounting hole whereby a terminal in the small connector and the terminal in the connector are connected to each other.

18. The lighting device for a display according to claim 17, wherein the small connector has a locking portion on an outer face of a housing thereof and the connector has a to-be-locked portion on an inner face of the mounting hole thereof, and the small connector is fitted into the mounting hole, whereby the locking portion is locked to the to-be-locked portion and the small connector is fixed to the connector.

19. The lighting device for a display according to claim 1, wherein the insertion portion of the chassis is opened in an axial direction of the light source.

20. The lighting device for a display according to claim 1, wherein the insertion portion of the chassis is opened in a direction orthogonal to an axial direction of the light source.

21. The lighting device for a display according to claim 20, wherein the chassis has a removing port for a light source, opened in the axial direction of the light source.

22. The lighting device for a display according to claim 21, wherein the removing port is closed with the connector inserted in the insertion portion.

23. The lighting device for a display according to claim 1, wherein a housing of the connector is formed of a polymeric material made of resin or silicone rubber.

24. The lighting device for a display according to claim 23, wherein a rigid interior member is inwardly fitted into the housing of the connector, and a terminal connected to an end of the power supply line is locked to the interior member.

25. The lighting device for a display according to claim 1, wherein a housing of the connector is of rectangular cross-section, circular cross-section, triangular cross-section or polygonal cross-section.

26. The lighting device for a display according to claim 1, wherein the insertion portion has a guiding projected portion for positioning, and the connector has a guiding groove, corresponding to the guiding projected portion, on an outer face of a housing thereof.

27. The lighting device for a display according to claim 1, wherein the locking portion of the connector is formed as a locking projected portion, and the to-be-locked portion of the chassis is formed as a locked groove cut out from the outside face of a connector inserting side along the inner face of the insertion portion, and the locked groove has a bent portion, and the connector is inserted in the insertion portion and the locking projected portion is slidingly inserted in the locked groove and then the connector is rotated about an axis, whereby the locking projected portion is locked to the bent portion.

28. The lighting device for a display according to claim 27, wherein an end of the locked groove has a turned-back portion bent toward a direction opposite to a connector inserting direction.

29. The lighting device for a display according to claim 27, wherein the bent portion of the locked groove is bent at an obtuse angle.

30. The lighting device for a display according to claim 27, wherein the locked groove is formed in a spiral shape.

31. The lighting device for a display according to claim 1, wherein the lighting device is a vertical type backlight in which the light source is disposed on a rear face side of a display panel via an optical member, and the display is illuminated from the rear face.

32. The lighting device for a display according to claim 31, wherein the through hole includes a plurality of through holes, communicating with the insertion portion, perforated in the chassis placed orthogonal to both sides of the light sources arranged in parallel, and ends of the light sources are inserted in the through holes so as to be positioned.

33. The lighting device for a display according to claim 31, wherein a guiding portion for positioning the light source is protruded from a member on a rear face side of the light source.

34. The lighting device for a display according to claim 1, wherein the lighting device is an edge light type backlight in which a light guiding plate is disposed on a rear face side of a display panel via an optical member, and the light source is placed on at least one side edge face of the light guiding plate.

35. The lighting device for a display according to claim 34, wherein the light source is surrounded by a reflector of substantially U-shaped cross-section, and a holder holding the light source is slidingly fitted into the reflector whereby the light source is positioned.

36. The lighting device for a display according to claim 1, wherein the lighting device is an edge light type front light in which a light guiding plate is disposed on a front face side of a display panel via an optical member, and the light source is placed on at least one side edge face of the light guiding plate.

37. The lighting device for a display according to claim 36, wherein the light source is surrounded by a reflector of substantially U-shaped cross-section, and a holder holding the light source is slidingly fitted into the reflector whereby the light source is positioned.

38. The lighting device for a display according to claim 1, wherein the display is so configured that a polarization of an electromagnetic wave is electrically controlled.

39. The lighting device for a display according to claim 1, wherein the display is so configured that an intensity of an electromagnetic wave is controlled by a physical, mechanical shuttering system.

40. The lighting device for a display according to claim 1, wherein a display panel is a crystal panel, and the display is a liquid crystal display.

41. A display wherein the lighting device for a display according to claim 1, an optical member, and a passive-type display panel without a self-luminous element are laminated.

42. A lighting device for a display, comprising:
- a light source having a first terminal at least at one end thereof;
- a power supply line for supplying power to the light source;
- a connector having a second terminal communicating with the power supply line therein; and
- a chassis having an insertion portion on an outside face of the chassis in communication with a through hole on an inside face of the chassis, the insertion portion arranged to receive the connector through the outside face of the chassis, wherein
- the connector, connected to the end of the power supply line, and the insertion portion of the chassis are fitted to each other detachably so as to enable the first terminal of the light source and the second terminal communicating with the power supply line to be connected to each other, and the connector is pulled out from the insertion portion of the chassis through the outside face of the chassis so that the insertion portion is opened on the outside face of the chassis; and
- the insertion portion of the chassis has a locking portion on an inner face thereof, and the connector has a to-be-locked portion on an outer face of a housing thereof, and the connector is fitted into the insertion portion, whereby the locking portion is locked to the to-be-locked portion and the connector is fixed to the chassis.

43. The lighting device for a display according to claim 42, wherein the connector is detached from the insertion portion by unlocking the locking portion and the to-be-locked portion with unlocking means.

44. A lighting device for a display, comprising:
- a light source having a first terminal at least at one end thereof;
- a power supply line for supplying power to the light source;
- a connector having a second terminal communicating with the power supply line therein; and
- a chassis having an insertion portion on an outside face of the chassis in communication with a through hole on an inside face of the chassis, the insertion portion arranged to receive the connector through the outside face of the chassis, wherein
- the connector, connected to the end of the power supply line, and the insertion portion of the chassis are fitted to each other detachably so as to enable the first terminal of the light source and the second terminal communicating with the power supply line to be connected to each other, and the connector is pulled out from the insertion portion of the chassis through the outside face of the chassis so that the insertion portion is opened on the outside face of the chassis; and
- the connector has a guiding projected portion for positioning on an outer face of a housing thereof, and the insertion portion of the chassis has a guiding groove corresponding to the guiding projected portion.

* * * * *

UNITED STATES PATENT AND TRADEMARK OFFICE
CERTIFICATE OF CORRECTION

PATENT NO. : 7,585,100 B2
APPLICATION NO. : 11/054268
DATED : September 8, 2009
INVENTOR(S) : Aoki et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 315 days.

Signed and Sealed this

Fourteenth Day of September, 2010

David J. Kappos
*Director of the United States Patent and Trademark Office*